(12) United States Patent
Ding

(10) Patent No.: US 11,966,016 B2
(45) Date of Patent: Apr. 23, 2024

(54) CAMERA OPTICAL LENS

(71) Applicant: AAC Optics (Suzhou) Co., Ltd., Suzhou (CN)

(72) Inventor: Shujian Ding, Shenzhen (CN)

(73) Assignee: AAC Optics (Suzhou) Co., Ltd., Suzhou (CN)

( * ) Notice: Subject to any disclaimer, the term of this patent is extended or adjusted under 35 U.S.C. 154(b) by 563 days.

(21) Appl. No.: 17/131,752

(22) Filed: Dec. 23, 2020

(65) Prior Publication Data

US 2022/0066149 A1 Mar. 3, 2022

(30) Foreign Application Priority Data

Sep. 3, 2020 (CN) .......................... 202010918112.0

(51) Int. Cl.
*G02B 13/18* (2006.01)
*G02B 9/62* (2006.01)
(Continued)

(52) U.S. Cl.
CPC ........... *G02B 13/0045* (2013.01); *G02B 9/62* (2013.01); *G02B 13/04* (2013.01); *G02B 13/06* (2013.01)

(58) Field of Classification Search
CPC .......... G02B 9/62; G02B 13/04; G02B 13/06; G02B 13/0045
See application file for complete search history.

(56) References Cited

U.S. PATENT DOCUMENTS 7,580,206 B2 * 8/2009 Chang ...................... G02B 9/60
359/717
2009/0219630 A1 * 9/2009 Yamamoto ............. G02B 7/008
359/708
(Continued)

FOREIGN PATENT DOCUMENTS

| CN | 108227147 A | * | 6/2018 | ............. G02B 1/041 |
| CN | 108254874 A | * | 7/2018 | ......... G02B 13/0045 |
| JP | 6529631 B1 | * | 6/2019 | ............. G02B 1/041 |

OTHER PUBLICATIONS

Herbert Gross (Editor), Hannfried Z¿gge (Editor), Martin Peschka (Editor), Fritz Blechinger (Editor), "Handbook of Optical Systems, vol. 3: Aberration Theory and Correction of Optical Systems," ISBN: 978-3-527-69925-4 Sep. 2015 pp. 377-379 (Year: 2015).*

*Primary Examiner* — Mustak Choudhury
*Assistant Examiner* — K Muhammad
(74) *Attorney, Agent, or Firm* — W&G Law Group

(57) ABSTRACT

A camera optical lens is provided, including from an object side to an image side: a first lens; a second lens; a third lens; a fourth lens; a fifth lens; and a sixth lens, the camera optical lens satisfies following conditions: $-2.80 \leq f1/f \leq -1.20$; $1.20 \leq d9/d11 \leq 1.90$; $1.20 \leq (R7+R8)/(R7-R8) \leq 5.00$; $0.70 \leq f2/f \leq 1.00$, where f denotes focal length of the camera optical lens; f1 denotes focal length of the first lens; f2 denotes focal length of the second lens; R7 denotes curvature radius of object side surface of the fourth lens; R8 denotes curvature radius of image side surface of the fourth lens; d9 denotes on-axis thickness of the fifth lens; d11 denotes on-axis thickness of the sixth lens. The above camera optical lens can meet design requirements for large aperture, wide angle and ultra-thinness, while maintaining good imaging quality.

12 Claims, 12 Drawing Sheets

(51) Int. Cl.
  *G02B 13/00*  (2006.01)
  *G02B 13/04*  (2006.01)
  *G02B 13/06*  (2006.01)

(56) References Cited

U.S. PATENT DOCUMENTS

| | | | |
|---|---|---|---|
| 2015/0177493 A1* | 6/2015 | Asami | G02B 9/62 |
| | | | 359/713 |
| 2017/0184817 A1* | 6/2017 | Lee | G02B 13/0045 |
| 2019/0196152 A1* | 6/2019 | Shi | G02B 1/041 |
| 2019/0324231 A1* | 10/2019 | Bian | G02B 9/64 |

\* cited by examiner

CAMERA OPTICAL LENS

TECHNICAL FIELD

The present invention relates to the technical field of optical lens and, in particular, to a camera optical lens suitable for handheld terminal devices such as smart phones or digital cameras, and imaging devices such as monitors or PC lenses.

BACKGROUND

With the emergence of smart phones in recent years, the demand for a miniature camera lens is continuously increasing, but in general, photosensitive devices of a camera lens are nothing more than a Charge Coupled Device (CCD) or a Complementary Metal-Oxide Semiconductor Sensor (CMOS sensor), and as progress of semiconductor manufacturing technology makes a pixel size of the photosensitive devices become smaller, in addition, a current development trend of electronic products requires better performance with thinner and smaller dimensions, miniature camera lenses with good imaging quality therefore have become a mainstream in the market.

In order to obtain better imaging quality, a camera lens traditionally equipped in a camera of a mobile phone generally constitutes three or four lenses. Moreover, with development of technology and increase in diversified requirements of users, a camera lens constituted by five, six or seven lenses gradually appears in camera design, in case that a pixel area of the photosensitive device is continuously reduced and requirements on imaging quality is continuously increased. Although the common camera lens constituted by six lenses has good optical performances, its configuration such as refractive power, lens spacing and lens shape still need to be optimized, therefore the camera lens may not meet design requirements for some optical performances such as large aperture, ultra-thinness and wide angle while maintaining good imaging quality.

SUMMARY

In view of the above problems, the present invention provides a camera optical lens, which may meet design requirements on some optical performances such as large aperture, wide angle and ultra-thinness while maintaining good imaging quality.

Embodiments of the present invention provide a camera optical lens, including from an object side to an image side:
a first lens;
a second lens;
a third lens;
a fourth lens;
a fifth lens; and
a sixth lens;
wherein the camera optical lens satisfies following conditions:

$-2.80 \leq f1/f \leq -1.20$;

$1.20 \leq d9/d11 \leq 1.90$;

$1.20 \leq (R7+R8)/(R7-R8) \leq 5.00$; and $0.70 \leq f2/f \leq 1.00$, where
f denotes a focal length of the camera optical lens;
f1 denotes a focal length of the first lens;
f2 denotes a focal length of the second lens;
R7 denotes a curvature radius of an object side surface of the fourth lens;
R8 denotes a curvature radius of an image side surface of the fourth lens;
d9 denotes an on-axis thickness of the fifth lens; and
d11 denotes an on-axis thickness of the sixth lens.

As an improvement, the camera optical lens satisfies a following condition:

$1.10 \leq (R5+R6)/(R5-R6) \leq 3.00$, where
R5 denotes a curvature radius of an object side surface of the third lens; and
R6 denotes a curvature radius of an image side surface of the third lens.

As an improvement, the camera optical lens satisfies following conditions:

$0.09 \leq (R1+R2)/(R1-R2) \leq 1.01$; and $0.02 \leq d1/TTL \leq 0.09$, where
R1 denotes a curvature radius of an object side surface of the first lens;
R2 denotes a curvature radius of an image side surface of the first lens;
d1 denotes an on-axis thickness of the first lens; and
TTL denotes a total optical length from the object side surface of the first lens to an image plane of the camera optical lens along an optic axis.

As an improvement, the camera optical lens satisfies following conditions:

$0.12 \leq (R3+R4)/(R3-R4) \leq 0.68$; and $0.07 \leq d3/TTL \leq 0.24$, where
R3 denotes a curvature radius of an object side surface of the second lens;
R4 denotes a curvature radius of an image side surface of the second lens;
d3 denotes an on-axis thickness of the second lens; and
TTL denotes a total optical length from an object side surface of the first lens to an image plane of the camera optical lens along an optic axis.

As an improvement, the camera optical lens satisfies following conditions:

$-6.38 \leq f3/f \leq -1.30$; and $0.02 \leq d5/TTL \leq 0.09$, where
f3 denotes a focal length of the third lens;
d5 denotes an on-axis thickness of the third lens; and
TTL denotes a total optical length from an object side surface of the first lens to an image plane of the camera optical lens along an optic axis.

As an improvement, the camera optical lens satisfies following conditions:

$0.51 \leq f4/f \leq 7.36$; and $0.06 \leq d7/TTL \leq 0.23$, where
f4 denotes a focal length of the fourth lens;
d7 denotes an on-axis thickness of the fourth lens; and
TTL denotes a total optical length from an object side surface of the first lens to an image plane of the camera optical lens along an optic axis.

As an improvement, the camera optical lens satisfies following conditions:

$0.58 \leq f5/f \leq 4.41$;

$0.52 \leq (R9+R10)/(R9-R10) \leq 5.98$; and $0.05 \leq d9/TTL \leq 0.18$, where
f5 denotes a focal length of the fifth lens;
R9 denotes a curvature radius of an object side surface of the fifth lens;
R10 denotes a curvature radius of an image side surface of the fifth lens;
d9 denotes an on-axis thickness of the fifth lens; and
TTL denotes a total optical length from an object side surface of the first lens to an image plane of the camera optical lens along an optic axis.

As an improvement, the camera optical lens satisfies following conditions:

$-2.34 \leq f6/f \leq -0.54$;

$0.74 \leq (R11+R12)/(R11-R12) \leq 3.19$; and $0.03 \leq d11/TTL \leq 0.11$, where
f6 denotes a focal length of the sixth lens;
R11 denotes a curvature radius of an object side surface of the sixth lens;
R12 denotes a curvature radius of an image side surface of the sixth lens;
d11 denotes an on-axis thickness of the sixth lens; and
TTL denotes a total optical length from an object side surface of the first lens to an image plane of the camera optical lens along an optic axis.

As an improvement, the camera optical lens satisfies a following condition:

$TTL/IH \leq 2.20$, where
IH denotes an image height of the camera optical lens; and
TTL denotes a total optical length from an object side surface of the first lens to an image plane of the camera optical lens along an optic axis.

As an improvement, the camera optical lens further satisfies a following condition:

$FOV \geq 119.80°$, where FOV denotes a field of view of the camera optical lens.

As an improvement, the camera optical lens further satisfies a following condition:

$FOV \leq 2.41$, where FNO denotes an F number of the camera optical lens.

The present invention has following beneficial effects: the camera optical lens according to the present invention not only has excellent optical performances, but also has large aperture, wide angle, and ultra-thinness properties, which is especially suitable for mobile phone camera lens components composed of high-pixel CCD, CMOS and other imaging elements and WEB camera lens.

BRIEF DESCRIPTION OF DRAWINGS

Many aspects of the exemplary embodiments may be better understood with reference to following drawings. The components in the drawings are not necessarily drawn to scale, the emphasis instead being placed upon clearly illustrating the principles of the present invention. Moreover, in the drawings, like reference numerals designate corresponding parts throughout the several views.

DESCRIPTION OF EMBODIMENTS

In order to better illustrate the objectives, technical solutions and advantages of the present invention, the present invention will be described in further detail below with reference to the accompanying drawings and embodiments. It should be understood that the specific embodiments described herein are only used to explain the present invention but are not used to limit the present invention.

Embodiment 1

Figure 1:
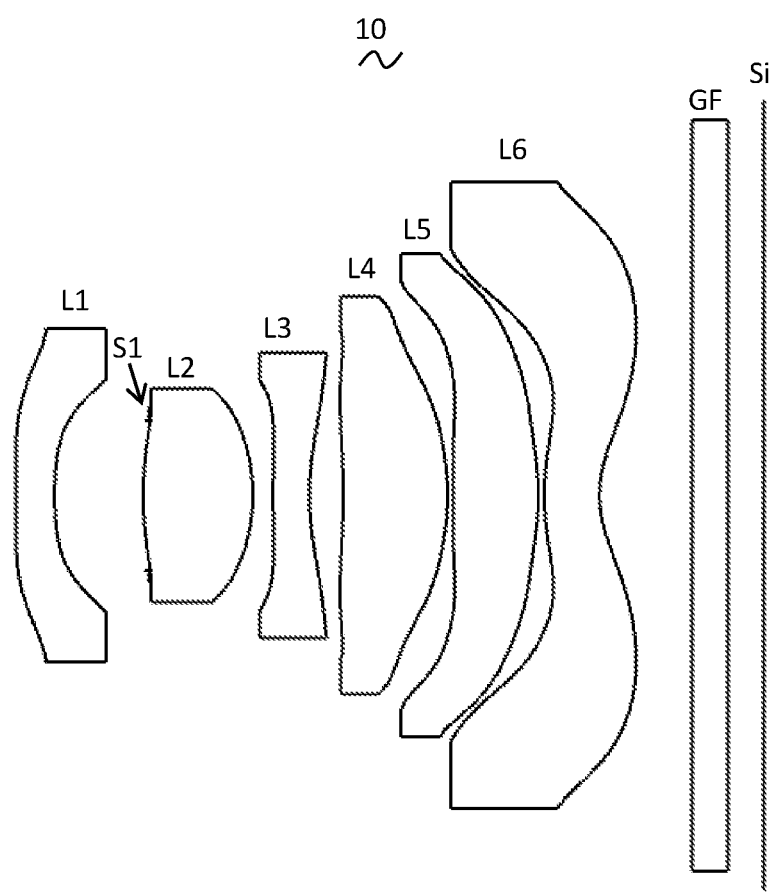
FIG. 1 is a structural schematic diagram of a camera optical lens according to Embodiment 1 of the present invention.

Referring to FIG. 1, the present invention provides a camera optical lens 10. FIG. 1 shows a camera optical lens 10 according to Embodiment 1 of the present invention. The camera optical lens 10 includes six lenses. The camera optical lens 10 includes, from an object side to an image side: a first lens L1, an aperture S1, a second lens L2, a third lens L3, a fourth lens L4, a fifth lens L5, and a sixth lens L6. An optical element such as an optical filter GF may be arranged between the sixth lens L6 and an image plane S1.

In this embodiment, the first lens L1 has negative refractive power, the second lens L2 has positive refractive power, the third lens L3 has negative refractive power, the fourth lens L4 has positive refractive power, the fifth lens L5 has positive refractive power, and the sixth lens L6 has negative refractive power.

In this embodiment, the first lens L1, the second lens L2, the third lens L3, the fourth lens L4, the fifth lens L5, and the sixth lens L6 are each made of a plastic material.

In this embodiment, a focal length of the camera optical lens 10 is defined as f, and a focal length of the first lens L1 is defined as f1. The focal length f and the focal length f1 satisfy a following condition: $-2.80 \leq f1/f \leq -1.20$, which specifies a ratio of the focal length to the focal length of the first lens to the focal length of the camera optical lens. Within the range of the above condition, it is beneficial to correct aberrations and improve imaging quality.

An on-axis thickness of the fifth lens L5 is defined as d9, an on-axis thickness of the sixth lens L6 is d11. The on-axis thickness d9 and the on-axis thickness d11 satisfy a following condition: $1.20 \leq d9/d11 \leq 1.90$, which specifies a ratio of the thickness of the fifth lens L5 to the thickness of the sixth lens L6. Within the range of the above condition, it is beneficial to process lenses.

A curvature radius of an object side surface of the fourth lens L4 is defined as R7, and a curvature radius of an image side surface of the fourth lens L4 is defined as R8. The curvature radius R7 and the curvature radius R8 satisfy a following condition: $1.20 \leq (R7+R8)/(R7-R8) \leq 5.00$, which specifies a shape of the fourth lens L4. Within the range of the above condition, a degree of deflection of light passing through the lens may be alleviated, and aberrations may be effectively reduced.

The focal length of the camera optical lens 10 is defined as f, a focal length of the second lens L2 is defined as f2. The focal length f and the focal length f2 satisfy a following condition: $0.70 \leq f2/f \leq 1.00$, which specifies a ratio of the focal length of the second lens L2 to the focal length of the system. Within the range of the above condition, it is beneficial to improve performance of the optical system.

A curvature radius of an object side surface of the third lens L3 is defined as R5, and a curvature radius of an image side surface of the third lens L3 is R6. The curvature radius R5 and the curvature radius R6 satisfy a following condition: $1.10 \leq (R5+R6)/(R5-R6) \leq 3.00$ which specifies a shape of the fourth lens L4. Within the range of the above condition, it is beneficial to reduce sensitivity of the lens and improve a yield rate.

In this embodiment, the object side surface of the first lens L1 is concave in a paraxial region, and the image side surface of the first lens L1 is concave in the paraxial region.

A curvature radius of an object side surface of the first lens L1 is defined as R1, and a curvature radius of an image side surface of the first lens L1 is defined as R2. The curvature radius R1 and the curvature radius R2 satisfy a following condition: $0.09 \leq (R1+R2)/(R1-R2) \leq 1.01$. The shape of the first lens L1 is reasonably controlled so that the first lens L1 may effectively correct spherical aberration of the system. Optionally, the curvature radius R1 and the curvature radius R2 satisfy a following condition: $0.14 \leq (R1+R2)/(R1-R2) \leq 0.81$.

An on-axis thickness of the first lens L1 is defined as d1, and a total optical length from the object side surface of the first lens to an image plane of the camera optical lens 10 along an optic axis is defined as TTL. The on-axis thickness d1 and the total optical length TTL satisfy a following condition: $0.02 \leq d1/TTL \leq 0.09$. Within the range of the above condition, it is beneficial to achieve an ultra-thinness effect. Optionally, the on-axis thickness d1 and the total optical length TTL satisfy a following condition: $0.04 \leq d1/TTL \leq 0.07$.

In this embodiment, the object side surface of the second lens L2 is convex in a paraxial region, and the image side surface of the second lens L2 is convex in the paraxial region.

A curvature radius of an object side surface of the second lens L2 is defined as R3, and a curvature radius of an image side surface of the second lens L2 is defined as R4. The curvature radius R3 and the curvature radius R4 satisfy a following condition: $0.12 \leq (R3+R4)/(R3-R4) \leq 0.68$, which specifies a shape of the second lens L2. Within the range of the above condition, as the lens becomes ultra-thinness and wide-angle, it is beneficial to correct on-axis chromatic aberration. Optionally, the curvature radius R3 and the curvature radius R4 satisfy a following condition: $0.19 \leq (R3+R4)/(R3-R4) \leq 0.55$.

An on-axis thickness of the second lens L2 is defined as d3, and a total optical length from the object side surface of the first lens to an image plane of the camera optical lens 10 along an optic axis is defined as TTL. The on-axis thickness d3 and the total optical length TTL satisfy a following condition: $0.07 \leq d3/TTL \leq 0.24$. Within the range of the above condition, it is beneficial to achieve an ultra-thinness effect. Optionally, the on-axis thickness d3 and the total optical length TTL satisfy a following condition: $0.11 \leq d3/TTL \leq 0.20$.

In this embodiment, the object side surface of the third lens L3 is convex in a paraxial region, and the image side surface of the third lens L3 is concave in the paraxial region.

The focal length of the camera optical lens 10 is defined as f, and a focal length of the third lens L3 is f3. The focal length f and the focal length f3 satisfy a following condition: $-6.38 \leq f3/f \leq -1.30$. With appropriate configuration of the refractive power, the system may obtain better imaging quality and lower sensitivity. Optionally, the focal length f and the focal length f3 satisfy a following condition: $-3.99 \leq f3/f \leq -1.63$.

An on-axis thickness of the third lens L3 is d5, and a total optical length from the object side surface of the first lens to an image plane of the camera optical lens 10 along an optic axis is defined as TTL. The on-axis thickness d5 and the total optical length TTL satisfy a following condition: $0.02 \leq d5/TTL \leq 0.09$. Within the range of the above condition, it is beneficial to achieve an ultra-thinness effect. Optionally, the on-axis thickness d5 and the total optical length TTL satisfy a following condition: $0.04 \leq d5/TTL \leq 0.07$.

In this embodiment, the object side surface of the fourth lens L4 is concave in a paraxial region, and the image side surface of the fourth lens L4 is convex in the paraxial region.

The focal length of the camera optical lens 10 is defined as f, and a focal length of the fourth lens L4 as f4. The focal length f and the focal length f4 satisfy a following condition: $0.51 \leq f4/f \leq 7.36$. With appropriate configuration of the refractive power, the system may obtain better imaging quality and lower sensitivity. Optionally, the focal length f and the focal length f4 satisfy a following condition: $0.82 \leq f4/f \leq 5.89$.

An on-axis thickness of the fourth lens L4 is defined as d7, and a total optical length from the object side surface of the first lens to an image plane of the camera optical lens 10 along an optic axis is defined as TTL. The on-axis thickness d7 and the total optical length TTL satisfy a following condition: $0.06 \leq d7/TTL \leq 0.23$. Within the range of the above condition, it is beneficial to achieve an ultra-thinness effect. Optionally, the on-axis thickness d7 and the total optical length TTL satisfy a following condition: $0.10 \leq d7/TTL \leq 0.18$.

In this embodiment, the object side surface of the fifth lens L5 is concave in a paraxial region, and the image side surface of the fifth lens L5 is convex in the paraxial region.

The focal length of the camera optical lens 10 is defined as f, and a focal length of the fifth lens L5 is defined as f5. The focal length f and the focal length f5 satisfy a following condition: $0.58 \leq f5/f \leq 4.41$. The limitation on the fifth lens L5 may effectively make the camera lens have a gentle light angle, thereby reducing tolerance sensitivity. Optionally, the focal length f and the focal length f5 satisfy a following condition: $0.93 \leq f5/f \leq 3.53$.

A curvature radius of an object side surface of the fifth lens L5 is defined as R9, and a curvature radius of an image side surface of the fifth lens L5 is defined as R10. The curvature radius R9 and the curvature radius R10 satisfy a following condition: $0.52 \leq (R9+R10)/(R9-R10) \leq 5.98$, which specifies a shape of the fifth lens L5. Within the range of the above condition, it is beneficial to correct aberration of off-axis angle with the development of ultra-thinness and wide angle. Optionally, the curvature radius R9 and the curvature radius R10 satisfy a following condition: $0.84 \leq (R9+R10)/(R9-R10) \leq 4.79$.

An on-axis thickness of the fifth lens L5 is defined as d9, and a total optical length from the object side surface of the first lens to an image plane of the camera optical lens 10 along an optic axis is defined as TTL. The on-axis thickness d9 and the total optical length TTL satisfy a following condition: $0.05 \leq d9/TTL \leq 0.18$. Within the range of the above condition, it is beneficial to achieve an ultra-thinness effect. Optionally, the on-axis thickness d9 and the total optical length TTL satisfy a following condition: $0.08 \leq d9/TTL \leq 0.14$.

In this embodiment, the object side surface of the sixth lens L6 is convex in a paraxial region, and the image side surface of the sixth lens L6 is concave in the paraxial region.

The focal length of the camera optical lens 10 is defined as f, and a focal length of the sixth lens L6 is defined as f6. The focal length f and the focal length f6 satisfy a following condition: $-2.34 \leq f6/f \leq -0.54$. With appropriate configuration of the refractive power, the system may obtain better imaging quality and lower sensitivity. Optionally, the focal length f and the focal length f6 satisfy a following condition: it satisfies $-1.46 \leq f6/f \leq -0.68$.

A curvature radius of an object side surface of the sixth lens L6 is defined as R11, and a curvature radius of an image side surface of the sixth lens L6 is defined as R12. The curvature radius R11 and the curvature radius R12 satisfy a following condition: $0.74 \leq (R11+R12)/(R11-R12) \leq 3.19$, which specifies a shape of the sixth lens L6. Within the range of the above condition, it is beneficial to correct aberration of off-axis angle with the development of ultra-thinness and wide angle. Optionally, the curvature radius R11 and the curvature radius R12 satisfy a following condition: $1.19 \leq (R11+R12)/(R11-R12) \leq 2.55$.

An on-axis thickness of the sixth lens L6 is defined as d11, and a total optical length from the object side surface of the first lens to an image plane of the camera optical lens 10 along an optic axis is defined as TTL. The on-axis thickness d11 and the total optical length TTL satisfy a following condition: $0.03 \leq d11/TTL \leq 0.11$. Within the range of the above condition, it is beneficial to achieve an ultra-thinness effect. Optionally, the on-axis thickness d11 and the total optical length TTL satisfy a following condition: $0.04 \leq d11/TTL \leq 0.09$.

In this embodiment, an image height of the camera optical lens 10 is IH, and a total optical length from the object side surface of the first lens to an image plane of the camera optical lens 10 along an optic axis is defined as TTL. The image height IH and the total optical length TTL satisfy a following condition: $TTL/IH \leq 2.20$. Within the range of the condition, it is beneficial to achieve an ultra-thinness effect.

In this embodiment, a field of view FOV of the camera optical lens 10 is greater than or equal to 119.8°, so that a wide-angle effect is achieved.

In this embodiment, an F number FNO of the camera optical lens 10 is less than or equal to 2.41, so that a large aperture is achieved, thereby obtaining a good imaging quality of the camera optical lens.

In this embodiment, an overall focal length of the camera optical lens 10 is defined as f, and a combined focal length of the first lens L1 and the second lens L2 is defined as f12. The focal length f and the focal length f12 satisfy a following condition: $0.40 \leq f12/f \leq 2.11$, Within the range of the above condition, the aberration and distortion of the camera optical lens 10 may be eliminated, and a back focal length of the camera optical lens 10 may be suppressed, so that miniaturization of an imaging lens system may be maintained. Optionally, the focal length f and the focal length f12 satisfy a following condition: $0.64 \leq f12/f \leq 1.69$.

When the above conditions are satisfied, the camera optical lens 10 may meet the design requirements on large aperture, wide angle and ultra-thinness while maintaining good optical performances. According to properties of the camera optical lens 10, the camera optical lens 10 is especially suitable for mobile phone camera lens components composed of high-pixel CCD, CMOS and other imaging elements and WEB camera lens.

The camera optical lens 10 of the present invention will be described below with examples. The symbols recorded in each example will be described as follows. The focal length, on-axis distance, curvature radius, on-axis thickness, inflection point position, and arrest point position are each in unit of millimeter (mm).

TTL denotes a total optical length (on-axis distance from the object side surface of the first lens L1 to the image plane S1), with a unit of millimeter (mm).

F number FNO denotes a ratio of an effective focal length of the camera optical lens to an entrance pupil diameter.

Optionally, the object side surface and/or the image side surface of the lens may be provided with inflection points and/or arrest points in order to meet high-quality imaging requirements. The description below may be referred to in specific embodiments as follows.

Design data of the camera optical lens 10 according to Embodiment 1 of the present invention are shown in Tables 1 and 2.

TABLE 1

| | R | d | | nd | | vd | |
|---|---|---|---|---|---|---|---|
| S1 | ∞ | d0= | −0.778 | | | | |
| R1 | −6.271 | d1= | 0.226 | nd1 | 1.5444 | v1 | 55.82 |
| R2 | 2.418 | d2= | 0.521 | | | | |
| R3 | 2.194 | d3= | 0.644 | nd2 | 1.5444 | v2 | 55.82 |
| R4 | −1.090 | d4= | 0.120 | | | | |
| R5 | 5.279 | d5= | 0.213 | nd3 | 1.6400 | v3 | 23.54 |
| R6 | 1.607 | d6= | 0.199 | | | | |
| R7 | −3.580 | d7= | 0.614 | nd4 | 1.5444 | v4 | 55.82 |
| R8 | −1.298 | d8= | 0.032 | | | | |
| R9 | −11.064 | d9= | 0.502 | nd5 | 1.5444 | v5 | 55.82 |
| R10 | −1.258 | d10= | 0.035 | | | | |
| R11 | 1.777 | d11= | 0.323 | nd6 | 1.6400 | v6 | 23.54 |

TABLE 1-continued

| | R | d | | nd | | vd | |
|---|---|---|---|---|---|---|---|
| R12 | 0.640 | d12= | 0.543 | | | | |
| R13 | ∞ | d13= | 0.210 | ndg | 1.5168 | vg | 64.17 |
| R14 | ∞ | d14= | 0.214 | | | | |

The reference signs are explained as follows.

S1: aperture;

R: central curvature radius of an optical surface;

R1: curvature radius of the object side surface of the first lens L1;

R2: curvature radius of the image side surface of the first lens L1;

R3: curvature radius of the object side surface of the second lens L2;

R4: curvature radius of the image side surface of the second lens L2;

R5: curvature radius of the object side surface of the third lens L3;

R6: curvature radius of the image side surface of the third lens L3;

R7: curvature radius of the object side surface of the fourth lens L4;

R8: curvature radius of the image side surface of the fourth lens L4;

R9: curvature radius of the object side surface of the fifth lens L5;

R10: curvature radius of the image side surface of the fifth lens L5;

R11: curvature radius of the object side surface of the sixth lens L6;

R12: curvature radius of the image side surface of the sixth lens L6;

R13: curvature radius of the object side surface of the optical filter GF;

R14: curvature radius of the image side surface of the optical filter GF;

d: on-axis thickness of a lens and an on-axis distance between lenses;

d0: on-axis distance from the aperture S1 to the object side surface of the first lens L1;

d1: on-axis thickness of the first lens L1;

d2: on-axis distance from the image side surface of the first lens L1 to the object side surface of the second lens L2;

d3: on-axis thickness of the second lens L2;

d4: on-axis distance from the image side surface of the second lens L2 to the object side surface of the third lens L3;

d5: on-axis thickness of the third lens L3;

d6: on-axis distance from the image side surface of the third lens L3 to the object side surface of the fourth lens L4;

d7: on-axis thickness of the fourth lens L4;

d8: on-axis distance from the image side surface of the fourth lens L4 to the object side surface of the fifth lens L5;

d9: on-axis thickness of the fifth lens L5;

d10: on-axis distance from the image side surface of the fifth lens L5 to the object side surface of the sixth lens L6;

d11: on-axis thickness of the sixth lens L6;

d12: on-axis distance from the image side surface of the sixth lens L6 to the object side surface of the optical filter GF;

d13: on-axis thickness of the optical filter GF;

d14: on-axis distance from the image side surface of the optical filter GF to the image plane S1;

nd: refractive index of a d-line;

nd1: refractive index of the d-line of the first lens L1;

nd2: refractive index of the d-line of the second lens L2;

nd3: refractive index of the d-line of the third lens L3;

nd4: refractive index of the d-line of the fourth lens L4;

nd5: refractive index of the d-line of the fifth lens L5;

nd6: refractive index of the d-line of the sixth lens L6;

ndg: refractive index of the d-line of the optical filter GF;

vd: Abbe number;

v1: Abbe number of the first lens L1;

v2: Abbe number of the second lens L2;

v3: Abbe number of the third lens L3;

v4: Abbe number of the fourth lens L4;

v5: Abbe number of the fifth lens L5;

v6: Abbe number of the sixth lens L6;

vg: Abbe number of the optical filter GF.

Table 2 shows aspherical surface data of each lens in the camera optical lens 10 according to Embodiment 1 of the present invention.

TABLE 2

| | Conic coefficient | Aspherical surface coefficient | | | | |
|---|---|---|---|---|---|---|
| | k | A4 | A6 | A8 | A10 | A12 |
| R1 | 3.6964E+01 | 9.9103E−01 | −1.9122E+00 | 3.4211E+00 | −4.1727E+00 | 2.8072E+00 |
| R2 | 4.0678E+00 | 1.3040E+00 | −6.1657E−01 | −9.4901E+00 | 7.3716E+01 | −2.2124E+02 |
| R3 | −5.3918E+00 | 1.5905E−01 | −3.0749E+00 | 5.1636E+01 | −5.6476E+02 | 3.4180E+03 |
| R4 | −1.3932E+01 | −1.2753E+00 | 4.6147E+00 | −2.2976E+01 | 8.5400E+01 | −2.1785E+02 |
| R5 | 5.0020E+01 | −4.3793E−01 | −1.6404E+00 | 9.4810E+00 | −3.2220E+01 | 6.3321E+01 |
| R6 | −1.5050E+01 | 1.7062E+00 | −2.3072E+00 | 1.0545E+01 | −2.7969E+01 | 4.2667E+01 |
| R7 | 8.7790E+00 | 4.7828E−01 | −1.2094E+00 | 2.8986E+00 | −3.6252E+00 | 1.6573E+00 |
| R8 | −4.3093E+00 | 7.3259E−01 | −4.2863E+00 | 9.5920E+00 | −1.1795E+01 | 8.7419E+00 |
| R9 | 6.5839E+01 | 9.2224E−01 | −3.2961E+00 | 4.4365E+00 | −2.4596E+00 | −8.5024E−02 |
| R10 | −1.6310E+00 | 1.3639E+00 | −3.9163E+00 | 5.7412E+00 | −4.8635E+00 | 2.3919E+00 |
| R11 | −2.3101E+00 | 2.5668E−01 | −3.5858E+00 | 7.3698E+00 | −7.5842E+00 | 4.2306E+00 |
| R12 | −1.7210E+00 | −9.3948E−01 | 1.0460E+00 | −7.1400E−01 | 3.0330E−01 | −7.9226E−02 |

| | Conic coefficient | Aspherical surface coefficient | | | |
|---|---|---|---|---|---|
| | k | A14 | A16 | A18 | A20 |
| R1 | 3.6964E+01 | −1.0381E+00 | 2.1229E−01 | 0.0000E+00 | 0.0000E+00 |
| R2 | 4.0678E+00 | 2.9728E+02 | −1.6043E+02 | 0.0000E+00 | 0.0000E+00 |
| R3 | −5.3918E+00 | −1.1019E+04 | 1.4601E+04 | 0.0000E+00 | 0.0000E+00 |

TABLE 2-continued

| | | | | |
|---|---|---|---|---|
| R4 | −1.3932E+01 | 2.9561E+02 | −1.6236E+02 | 0.0000E+00 | 0.0000E+00 |
| R5 | 5.0020E+01 | −8.7667E+01 | 6.5949E+01 | 0.0000E+00 | 0.0000E+00 |
| R6 | −1.5050E+01 | −3.4919E+01 | 1.2129E+01 | 0.0000E+00 | 0.0000E+00 |
| R7 | 8.7790E+00 | 4.6479E−01 | −5.0615E−01 | 0.0000E+00 | 0.0000E+00 |
| R8 | −4.3093E+00 | −3.6550E+00 | 6.4796E−01 | 0.0000E+00 | 0.0000E+00 |
| R9 | 6.5839E+01 | 5.8244E−01 | −1.5263E−01 | 0.0000E+00 | 0.0000E+00 |
| R10 | −1.6310E+00 | −6.4220E−01 | 7.3727E−02 | 0.0000E+00 | 0.0000E+00 |
| R11 | −2.3101E+00 | −1.2113E+00 | 1.3951E−01 | 0.0000E+00 | 0.0000E+00 |
| R12 | −1.7210E+00 | 1.1522E−02 | −6.9878E−04 | 0.0000E+00 | 0.0000E+00 |

Here, k denotes a conic coefficient, and A4, A6, A8, A10, A12, A14, A16, A18, and A20 denote an aspherical coefficient, respectively.

$$y=(x^2/R)/\{1+[1-(k+1)(x^2/R^2)]^{1/2}\}+A4x^4+A6x^6+A8x^8+A10x^{10}+A12x^{12}+A14x^{14}+A16x^{16}+A18x^{18}+A20x^{20} \quad (1)$$

Here, x denotes a vertical distance between a point on an aspherical curve and the optical axis, and y denotes a depth of the aspherical surface, i.e., a vertical distance between a point on the aspherical surface having a distance x from the optical axis and a tangent plane tangent to a vertex on an aspherical optical axis.

For convenience, the aspherical surface of each lens surface uses the aspherical surface shown in the above formula (1). However, the present invention is not limited to the aspherical polynomial form shown in the formula (1).

Design data of the inflection point and the arrest point of each lens in the camera optical lens 10 according to Embodiment 1 of the present invention are shown in Tables 3 and 4. Here, P1R1 and P1R2 denote the object side surface and image side surface of the first lens L1, respectively. P2R1 and P2R2 denote the object side surface and image side surface of the second lens L2, respectively. P3R1 and P3R2 denote the object side surface and image side surface of the third lens L3, respectively. P4R1 and P4R2 denote the object side surface and image side surface of the fourth lens L4, respectively. P5R1 and P5R2 denote the object side surface and image side surface of the fifth lens L5, respectively. P6R1 and P6R2 denote the object side surface and image side surface of the sixth lens L6, respectively. Data in an "inflection point position" column are a vertical distance from an inflexion point provided on a surface of each lens to the optical axis of the camera optical lens 10. Data in an "arrest point position" column are a vertical distance from an arrest point provided on the surface of each lens to the optical axis of the camera optical lens 10.

TABLE 3

| | Number of inflexion points | Inflexion point position 1 | Inflexion point position 2 | Inflexion point position 3 |
|---|---|---|---|---|
| P1R1 | 2 | 0.125 | 0.785 | / |
| P1R2 | 1 | 0.635 | / | / |
| P2R1 | 2 | 0.395 | 0.465 | / |
| P2R2 | 0 | / | / | / |
| P3R1 | 1 | 0.185 | / | / |
| P3R2 | 2 | 0.435 | 0.745 | / |
| P4R1 | 2 | 0.295 | 0.785 | / |
| P4R2 | 2 | 0.755 | 1.005 | / |
| P5R1 | 3 | 0.095 | 0.405 | 1.135 |
| P5R2 | 3 | 0.335 | 0.365 | 1.315 |
| P6R1 | 2 | 0.345 | 1.175 | / |
| P6R2 | 2 | 0.395 | 1.715 | / |

TABLE 4

| | Number of arrest points | Arrest point position 1 | Arrest point position 2 |
|---|---|---|---|
| P1R1 | 1 | 0.215 | / |
| P1R2 | 0 | / | / |
| P2R1 | 0 | / | / |
| P2R2 | 0 | / | / |
| P3R1 | 1 | 0.305 | / |
| P3R2 | 0 | / | / |
| P4R1 | 2 | 0.565 | 0.885 |
| P4R2 | 0 | / | / |
| P5R1 | 2 | 0.175 | 0.545 |
| P5R2 | 0 | / | / |
| P6R1 | 1 | 0.545 | / |
| P6R2 | 1 | 0.975 | / |

Figure 2:
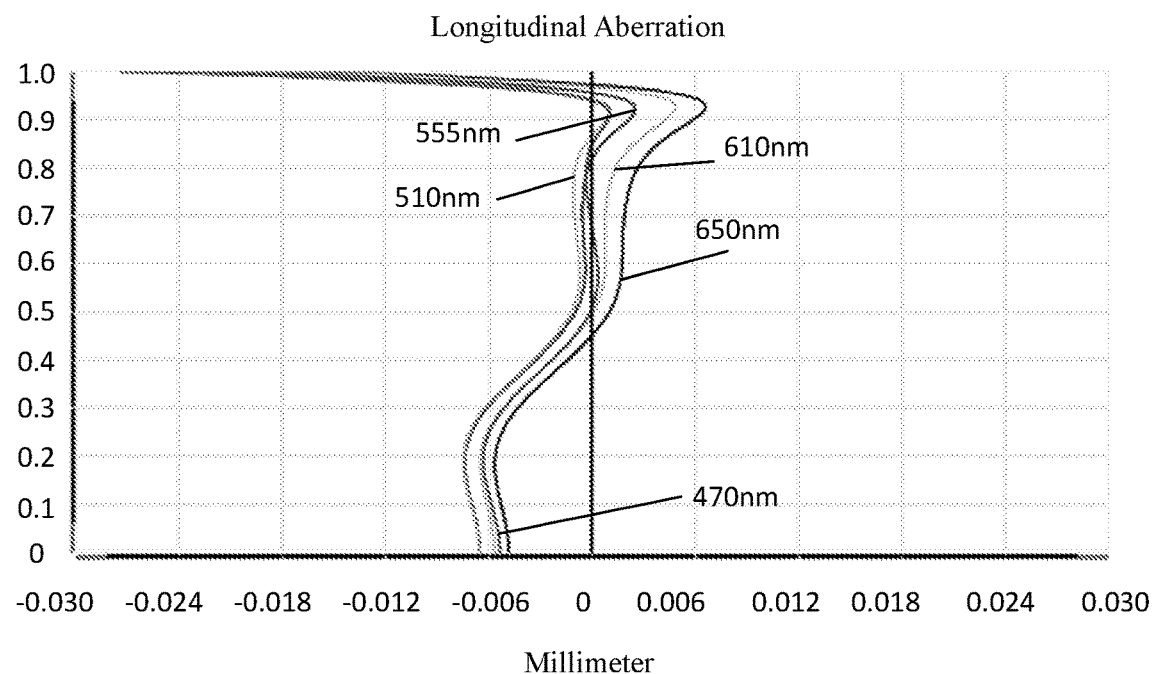
FIG. 2 is a schematic diagram of a longitudinal aberration of the camera optical lens shown in FIG. 1.
Figure 3:
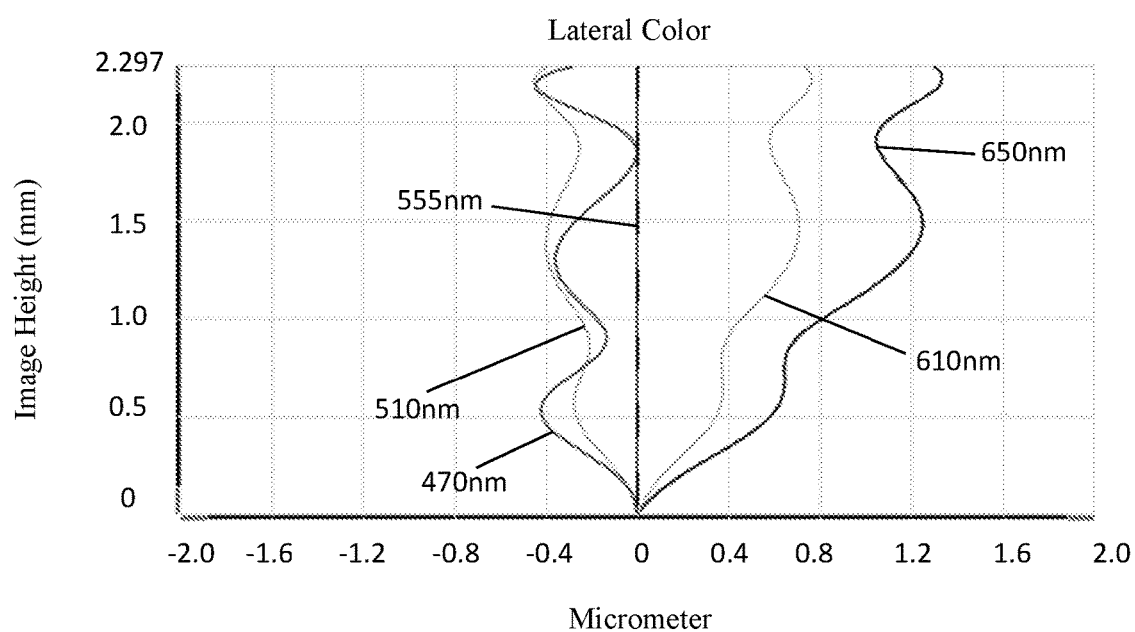
FIG. 3 is a schematic diagram of a lateral color of the camera optical lens shown in FIG. 1.
Figure 4:
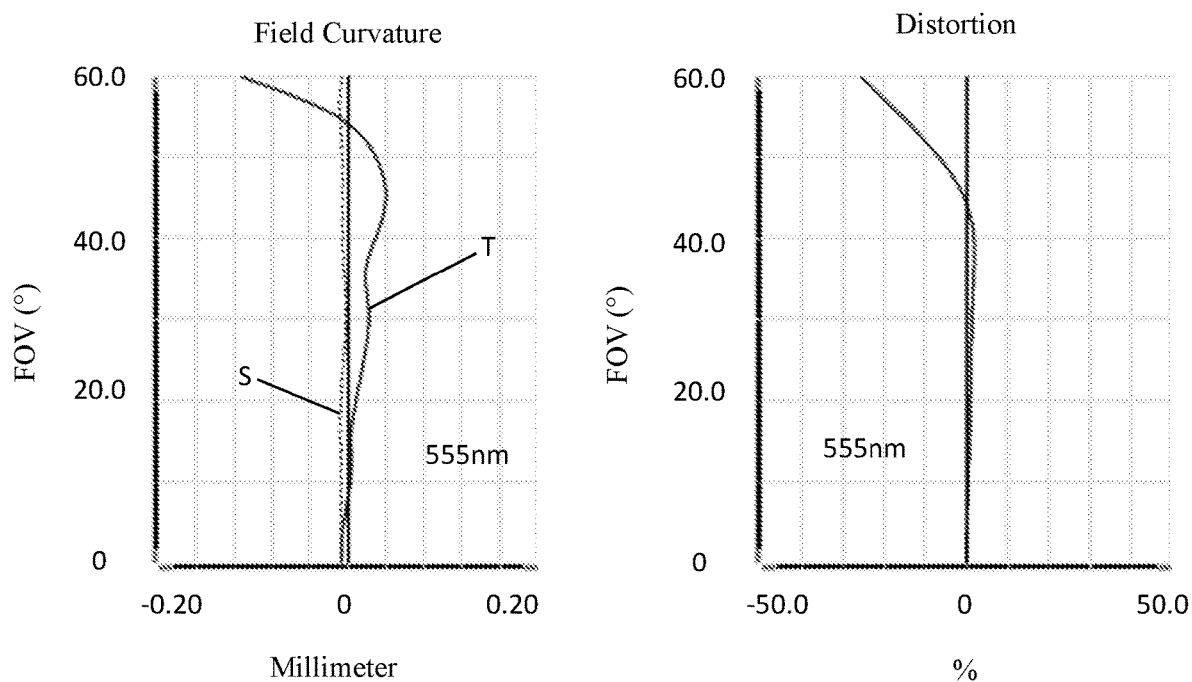
FIG. 4 is a schematic diagram of a field curvature and a distortion of the camera optical lens shown in FIG. 1.

FIG. 2 and FIG. 3 are schematic diagrams of a longitudinal aberration and a lateral color of the camera optical lens 10 after light having a wavelength of 650 nm, 610 nm, 555 nm, 510 nm, and 470 nm passes through the camera optical lens 10 according to Embodiment 1, respectively. FIG. 4 is a schematic diagram of a field curvature and a distortion of the camera optical lens 10 after light having a wavelength of 555 nm passes through the camera optical lens 10 according to Embodiment 1. A field curvature S in FIG. 4 is a field curvature in a sagittal direction, and T is a field curvature in a meridian direction.

Table 17 below shows numerical values corresponding to various numerical values in Embodiments 1, 2, 3 and 4 and parameters specified in the conditions.

As shown in Table 17, Embodiment 1 satisfies various conditions.

In this embodiment, an entrance pupil diameter ENPD of the camera optical lens 10 is 0.743 mm, a full-field image height IH is 2.297 mm, and a field of view FOV in a diagonal direction is 120.00°. The camera optical lens 10 satisfies design requirements for large aperture, wide angle and ultra-thinness. The on-axis and off-axis chromatic aberrations are fully corrected, thereby achieving excellent optical performances.

Embodiment 2

Figure 5:
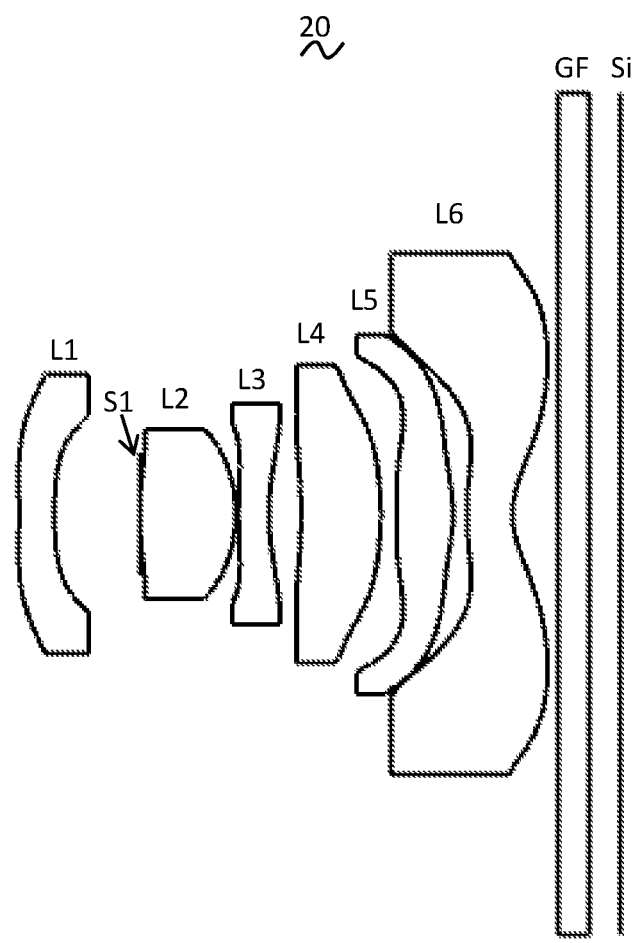
FIG. 5 is a structural schematic diagram of a camera optical lens according to Embodiment 2 of the present invention.

FIG. 5 shows a camera optical lens 20 according to Embodiment 2 of the present invention. Embodiment 2 is basically the same as Embodiment 1, and involves symbols having the same meanings as Embodiment 1, and only differences therebetween are listed below.

Design data of the camera optical lens 20 according to Embodiment 2 of the present invention are shown in Tables 5 and 6.

TABLE 5

| | R | d | | nd | | vd | |
|---|---|---|---|---|---|---|---|
| S1 | ∞ | d0= | −0.839 | | | | |
| R1 | −6.432 | d1= | 0.246 | nd1 | 1.5444 | v1 | 55.82 |

TABLE 5-continued

| | R | d | nd | | vd | |
|---|---|---|---|---|---|---|
| R2 | 4.475 | d2= 0.593 | | | | |
| R3 | 2.627 | d3= 0.664 | nd2 | 1.5444 | v2 | 55.82 |
| R4 | −1.078 | d4= 0.020 | | | | |
| R5 | 3.425 | d5= 0.210 | nd3 | 1.6400 | v3 | 23.54 |
| R6 | 1.700 | d6= 0.223 | | | | |
| R7 | −2.803 | d7= 0.553 | nd4 | 1.5444 | v4 | 55.82 |
| R8 | −1.866 | d8= 0.108 | | | | |
| R9 | −45.641 | d9= 0.392 | nd5 | 1.5444 | v5 | 55.82 |
| R10 | −1.067 | d10= 0.096 | | | | |
| R11 | 1.984 | d11= 0.316 | nd6 | 1.6400 | v6 | 23.54 |
| R12 | 0.588 | d12= 0.321 | | | | |
| R13 | ∞ | d13= 0.210 | ndg | 1.5168 | vg | 64.17 |
| R14 | ∞ | d14= 0.214 | | | | |

Table 6 shows aspherical surface data of each lens in the camera optical lens 20 according to Embodiment 2 of the present invention.

TABLE 6

| | Conic coefficient | Aspherical surface coefficient | | | | |
|---|---|---|---|---|---|---|
| | k | A4 | A6 | A8 | A10 | A12 |
| R1 | 3.4150E+01 | 6.3122E−01 | −8.1873E−01 | 1.2345E+00 | −1.5169E+00 | 1.4030E+00 |
| R2 | −4.6591E+00 | 8.8241E−01 | −8.0140E−01 | 2.8162E+00 | −1.0153E+01 | 3.3252E+01 |
| R3 | −1.0076E+01 | 3.7202E−02 | 3.7248E−01 | −1.3811E+01 | 1.3680E+02 | −8.2443E+02 |
| R4 | −1.1188E+01 | −1.4205E+00 | 5.0214E+00 | −1.7872E+01 | 3.6888E+01 | −4.6818E+01 |
| R5 | 2.0502E+01 | −7.3125E−01 | 3.6169E−01 | −1.1123E+00 | −3.7161E+00 | −2.0422E+00 |
| R6 | −1.3818E+01 | 1.1795E−01 | −1.8411E+00 | 7.7172E+00 | −1.9692E+01 | 2.9360E+01 |
| R7 | 6.4926E+00 | 4.4151E−01 | −7.6278E−01 | 5.3441E−01 | 3.7375E+00 | −1.0439E+01 |
| R8 | −3.0933E+00 | 7.2653E−01 | −4.3339E+00 | 1.0636E+01 | −1.6230E+01 | 1.5743E+01 |
| R9 | 8.9656E+01 | 1.2574E+00 | −4.4106E+00 | 8.4106E+00 | −1.1739E+01 | 1.0903E+01 |
| R10 | −2.5290E+00 | 1.4979E+00 | −3.6763E+00 | 4.7635E+00 | −3.8726E+00 | 2.0301E+00 |
| R11 | −1.4628E+00 | −2.3656E−01 | −1.9985E+00 | 4.3379E+00 | −4.2589E+00 | 2.1616E+00 |
| R12 | −3.1270E+00 | −5.4761E−01 | 6.0126E−01 | −4.1248E−01 | 1.7900E−01 | −4.8055E−02 |

| | Conic coefficient | Aspherical surface coefficient | | | |
|---|---|---|---|---|---|
| | k | A14 | A16 | A18 | A20 |
| R1 | 3.4150E+01 | −9.2020E−01 | 2.8243E−01 | 0.0000E+00 | 0.0000E+00 |
| R2 | −4.6591E+00 | −5.5649E+01 | 3.1903E+01 | 0.0000E+00 | 0.0000E+00 |
| R3 | −1.0076E+01 | 2.5614E+03 | −3.3127E+03 | 0.0000E+00 | 0.0000E+00 |
| R4 | −1.1188E+01 | 3.2895E+01 | −1.8035E+01 | 0.0000E+00 | 0.0000E+00 |
| R5 | 2.0502E+01 | 2.5000E+01 | −2.3168E+01 | 0.0000E+00 | 0.0000E+00 |
| R6 | −1.3818E+01 | −2.3942E+01 | 8.6414E+00 | 0.0000E+00 | 0.0000E+00 |
| R7 | 6.4926E+00 | 1.0640E+01 | −3.9838E+00 | 0.0000E+00 | 0.0000E+00 |
| R8 | −3.0933E+00 | −8.3752E+00 | 1.7884E+00 | 0.0000E+00 | 0.0000E+00 |
| R9 | 8.9656E+01 | −5.8067E+00 | 1.3071E+00 | 0.0000E+00 | 0.0000E+00 |
| R10 | −2.5290E+00 | −6.6332E−01 | 1.0362E−01 | 0.0000E+00 | 0.0000E+00 |
| R11 | −1.4628E+00 | −5.1649E−01 | 4.0372E−02 | 0.0000E+00 | 0.0000E+00 |
| R12 | −3.1270E+00 | 7.1622E−03 | −4.4393E−04 | 0.0000E+00 | 0.0000E+00 |

Design data of the inflection point and the arrest point of each lens in the camera optical lens 20 according to Embodiment 2 of the present invention are shown in Tables 7 and 8.

TABLE 7

| | Number of inflexion points | Inflexion point position 1 | Inflexion point position 2 | Inflexion point position 3 |
|---|---|---|---|---|
| P1R1 | 2 | 0.155 | 0.895 | / |
| P1R2 | 0 | / | / | / |
| P2R1 | 1 | 0.375 | / | / |
| P2R2 | 0 | / | / | / |
| P3R1 | 1 | 0.205 | / | / |
| P3R2 | 2 | 0.415 | 0.755 | / |
| P4R1 | 2 | 0.375 | 0.795 | / |
| P4R2 | 2 | 0.785 | 0.965 | / |
| P5R1 | 3 | 0.045 | 0.485 | 1.095 |
| P5R2 | 3 | 0.275 | 0.515 | 1.235 |
| P6R1 | 3 | 0.285 | 1.115 | 1.275 |
| P6R2 | 2 | 0.385 | 1.755 | / |

TABLE 8

| | Number of arrest points | Arrest point position 1 | Arrest point position 2 |
|---|---|---|---|
| P1R1 | 1 | 0.265 | / |
| P1R2 | 0 | / | / |
| P2R1 | 0 | / | / |
| P2R2 | 0 | / | / |
| P3R1 | 1 | 0.345 | / |
| P3R2 | 0 | / | / |
| P4R1 | 2 | 0.665 | 0.865 |
| P4R2 | 0 | / | / |
| P5R1 | 2 | 0.065 | 0.675 |
| P5R2 | 0 | / | / |
| P6R1 | 1 | 0.465 | / |
| P6R2 | 1 | 1.095 | / |

Figure 6:
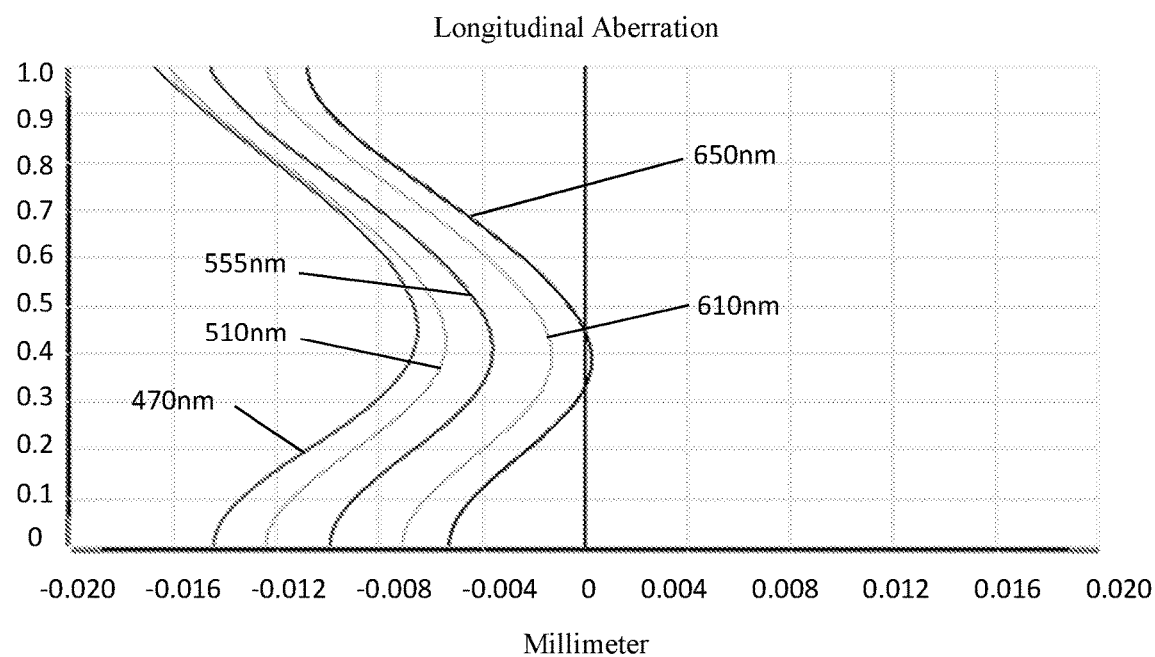
FIG. 6 is a schematic diagram of a longitudinal aberration of the camera optical lens shown in FIG. 5.
Figure 7:
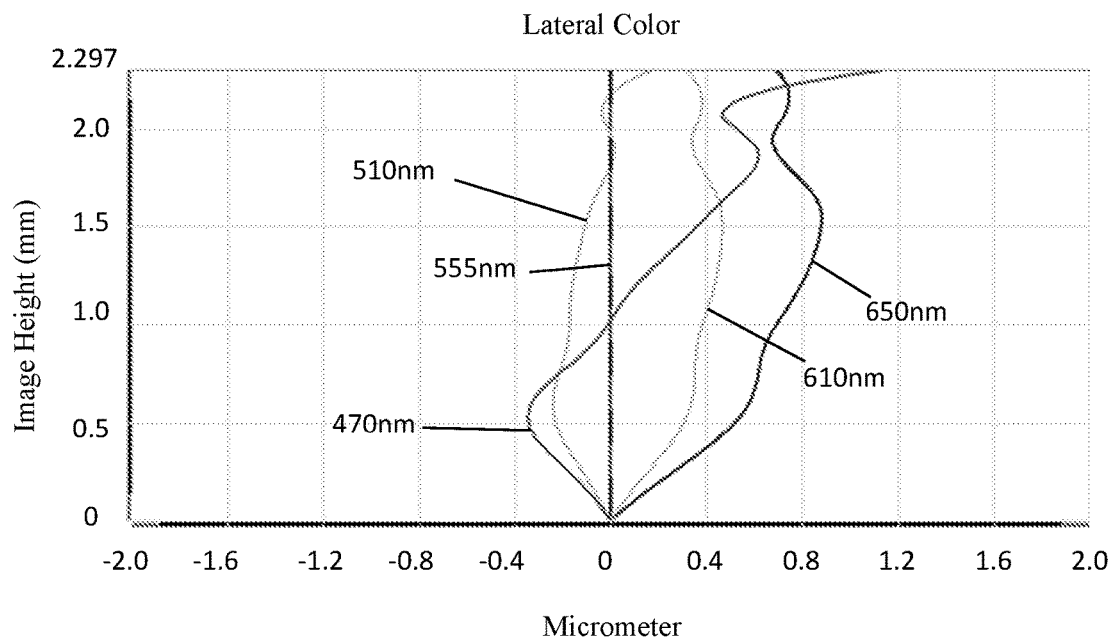
FIG. 7 is a schematic diagram of a lateral color of the camera optical lens shown in FIG. 5.
Figure 8:
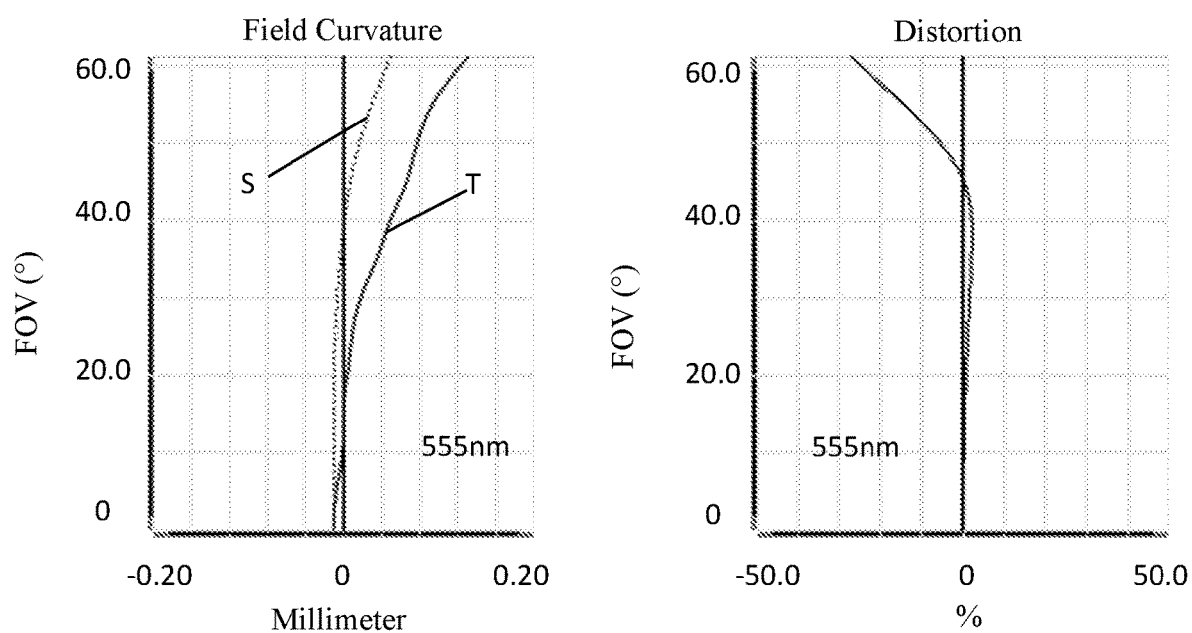
FIG. 8 is a schematic diagram of a field curvature and a distortion of the camera optical lens shown in FIG. 5.

FIG. 6 and FIG. 7 are schematic diagrams of a longitudinal aberration and a lateral color of the camera optical lens 20 after light having a wavelength of 650 nm, 610 nm, 555 nm, 510 nm, and 470 nm passes through the camera optical lens 20 according to Embodiment 2, respectively. FIG. 8 is a schematic diagram of a field curvature and a distortion after light having a wavelength of 555 nm passes through the camera optical lens 20 according to Embodiment 2 of the present invention.

As shown in Table 17, Embodiment 2 satisfies various conditions.

In this embodiment, an entrance pupil diameter ENPD of the camera optical lens 20 is 0.717 mm, a full-field image height IH is 2.297 mm, and a field of view FOV in a diagonal direction is 120.00°. The camera optical lens 20 satisfies design requirements for large aperture, wide angle, and ultra-thinness. The on-axis and off-axis chromatic aberrations are fully corrected, thereby achieving excellent optical performances.

Embodiment 3

Figure 9:
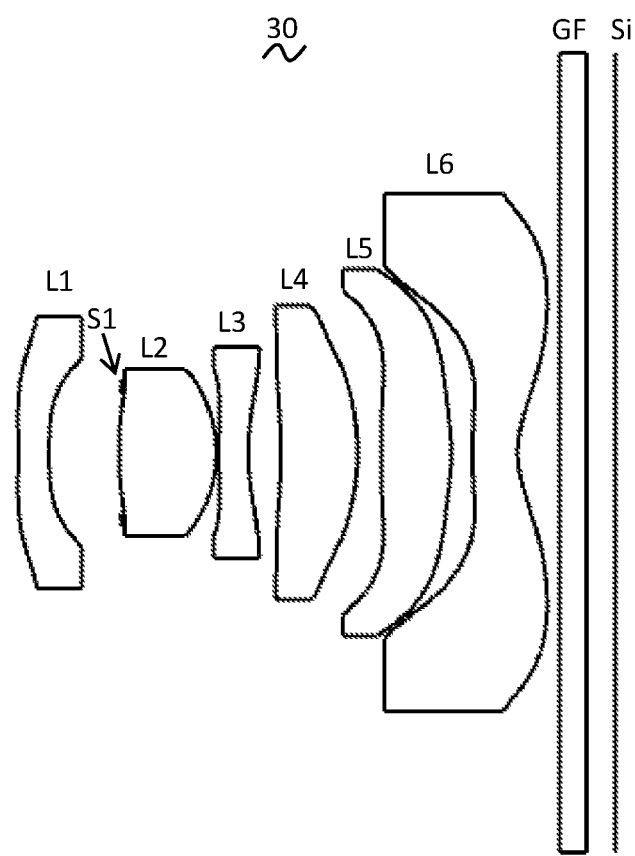
FIG. 9 is a structural schematic diagram of a camera optical lens according to Embodiment 3 of the present invention.

FIG. 9 shows a camera optical lens 30 according to Embodiment 3 of the present invention. Embodiment 3 is basically the same as Embodiment 1, and involves symbols having the same meanings as Embodiment 1, and only differences therebetween are listed below.

Design data of the camera optical lens 30 of Embodiment 3 of the present invention are shown in Tables 9 and 10.

TABLE 9

|     | R       | d    |        | nd     |     | vd    |
|-----|---------|------|--------|--------|-----|-------|
| S1  | ∞       | d0=  | −0.785 |        |     |       |
| R1  | −6.397  | d1=  | 0.231  | nd1 1.5444 | v1 | 55.82 |
| R2  | 3.243   | d2=  | 0.532  |        |     |       |
| R3  | 2.593   | d3=  | 0.735  | nd2 1.5444 | v2 | 55.82 |
| R4  | −0.969  | d4=  | 0.020  |        |     |       |
| R5  | 4.824   | d5=  | 0.222  | nd3 1.6400 | v3 | 23.54 |
| R6  | 1.597   | d6=  | 0.248  |        |     |       |
| R7  | −3.005  | d7=  | 0.580  | nd4 1.5444 | v4 | 55.82 |
| R8  | −1.539  | d8=  | 0.183  |        |     |       |
| R9  | −13.353 | d9=  | 0.528  | nd5 1.5444 | v5 | 55.82 |
| R10 | −1.448  | d10= | 0.160  |        |     |       |
| R11 | 4.002   | d11= | 0.343  | nd6 1.6400 | v6 | 23.54 |
| R12 | 0.785   | d12= | 0.312  |        |     |       |
| R13 | ∞       | d13= | 0.210  | ndg 1.5168 | vg | 64.17 |
| R14 | ∞       | d14= | 0.214  |        |     |       |

Table 10 shows aspherical surface data of each lens in the camera optical lens 30 of Embodiment 3 of the present invention.

TABLE 10

| | Conic coefficient | Aspherical surface coefficient | | | | |
|---|---|---|---|---|---|---|
| | k | A4 | A6 | A8 | A10 | A12 |
| R1  | 3.2174E+01  | 6.6868E−01  | −1.0124E+00 | 1.4857E+00  | −1.6382E+00 | 1.0173E+00 |
| R2  | −1.6683E+01 | 9.6979E−01  | −6.7138E−01 | −5.2473E−01 | 8.8075E+00  | −2.2604E+01 |
| R3  | −6.0619E+00 | 5.1724E−02  | 4.3723E−01  | −1.3400E+01 | 1.2977E+02  | −7.4409E+02 |
| R4  | −1.0780E+01 | −1.2960E+00 | 4.8520E+00  | −1.7576E+01 | 3.4919E+01  | −3.2692E+01 |
| R5  | 3.4898E+01  | −4.8990E−01 | −6.3153E−01 | 7.2008E+00  | −3.9906E+01 | 1.0434E+02 |
| R6  | −1.7037E+01 | 9.2637E−02  | −1.4490E+00 | 6.6210E+00  | −1.9062E+01 | 3.2075E+01 |
| R7  | 7.4282E+00  | 4.4623E−01  | −1.0299E+00 | 1.7587E+00  | 1.7615E−01  | −4.4777E+00 |
| R8  | −4.3594E+00 | 4.1686E−01  | −2.2976E+00 | 5.1781E+00  | −7.7536E+00 | 7.8029E+00 |
| R9  | 8.3434E+01  | 7.6855E−01  | −2.7459E+00 | 5.1048E+00  | −6.6101E+00 | 5.4552E+00 |
| R10 | −1.3579E+00 | 1.0908E+00  | −2.9763E+00 | 4.7191E+00  | −4.6680E+00 | 2.7469E+00 |
| R11 | −1.5542E−01 | 1.8957E−02  | −1.9885E+00 | 3.9478E+00  | −3.7996E+00 | 1.9282E+00 |
| R12 | −1.9471E+00 | −6.5074E−01 | 6.7055E−01  | −4.3222E−01 | 1.7661E−01  | −4.4670E−02 |

| | Conic coefficient | Aspherical surface coefficient | | | |
|---|---|---|---|---|---|
| | k | A14 | A16 | A18 | A20 |
| R1  | 3.2174E+01  | −3.2758E−01 | 5.3445E−02  | 0.0000E+00 | 0.0000E+00 |
| R2  | −1.6683E+01 | 1.8569E+01  | −2.4306E+00 | 0.0000E+00 | 0.0000E+00 |
| R3  | −6.0619E+00 | 2.2131E+03  | −2.7206E+03 | 0.0000E+00 | 0.0000E+00 |
| R4  | −1.0780E+01 | −1.3304E+00 | 1.4893E+01  | 0.0000E+00 | 0.0000E+00 |
| R5  | 3.4898E+01  | −1.3859E+02 | 7.8437E+01  | 0.0000E+00 | 0.0000E+00 |
| R6  | −1.7037E+01 | −2.9286E+01 | 1.1432E+01  | 0.0000E+00 | 0.0000E+00 |
| R7  | 7.4282E+00  | 5.5175E+00  | −2.2469E+00 | 0.0000E+00 | 0.0000E+00 |
| R8  | −4.3594E+00 | −4.3349E+00 | 9.5482E−01  | 0.0000E+00 | 0.0000E+00 |
| R9  | 8.3434E+01  | −2.4920E+00 | 4.7242E−01  | 0.0000E+00 | 0.0000E+00 |
| R10 | −1.3579E+00 | −8.8064E−01 | 1.1833E−01  | 0.0000E+00 | 0.0000E+00 |
| R11 | −1.5542E−01 | −4.8546E−01 | 4.7067E−02  | 0.0000E+00 | 0.0000E+00 |
| R12 | −1.9471E+00 | 6.2982E−03  | −3.7334E−04 | 0.0000E+00 | 0.0000E+00 |

Design data of the inflection point and the arrest point of each lens in the camera optical lens 30 according to Embodiment 3 of the present invention are shown in Tables 11 and 12.

TABLE 11

|  | Number of inflexion points | Inflexion point position 1 | Inflexion point position 2 | Inflexion point position 3 |
|---|---|---|---|---|
| P1R1 | 2 | 0.155 | 0.835 | / |
| P1R2 | 0 | / | / | / |
| P2R1 | 1 | 0.415 | / | / |
| P2R2 | 0 | / | / | / |
| P3R1 | 1 | 0.195 | / | / |
| P3R2 | 2 | 0.425 | 0.775 | / |
| P4R1 | 2 | 0.395 | 0.785 | / |
| P4R2 | 2 | 0.795 | 0.975 | / |
| P5R1 | 3 | 0.095 | 0.455 | 1.175 |
| P5R2 | 1 | 1.325 | / | / |
| P6R1 | 3 | 0.285 | 1.215 | 1.385 |
| P6R2 | 2 | 0.435 | 1.855 | / |

TABLE 12

|  | Number of arrest points | Arrest point position 1 | Arrest point position 2 |
|---|---|---|---|
| P1R1 | 1 | 0.265 | / |
| P1R2 | 0 | / | / |
| P2R1 | 0 | / | / |
| P2R2 | 0 | / | / |
| P3R1 | 1 | 0.335 | / |
| P3R2 | 0 | / | / |
| P4R1 | 2 | 0.695 | 0.835 |
| P4R2 | 0 | / | / |
| P5R1 | 2 | 0.165 | 0.605 |
| P5R2 | 0 | / | / |
| P6R1 | 1 | 0.445 | / |
| P6R2 | 1 | 1.135 | / |

Figure 10:
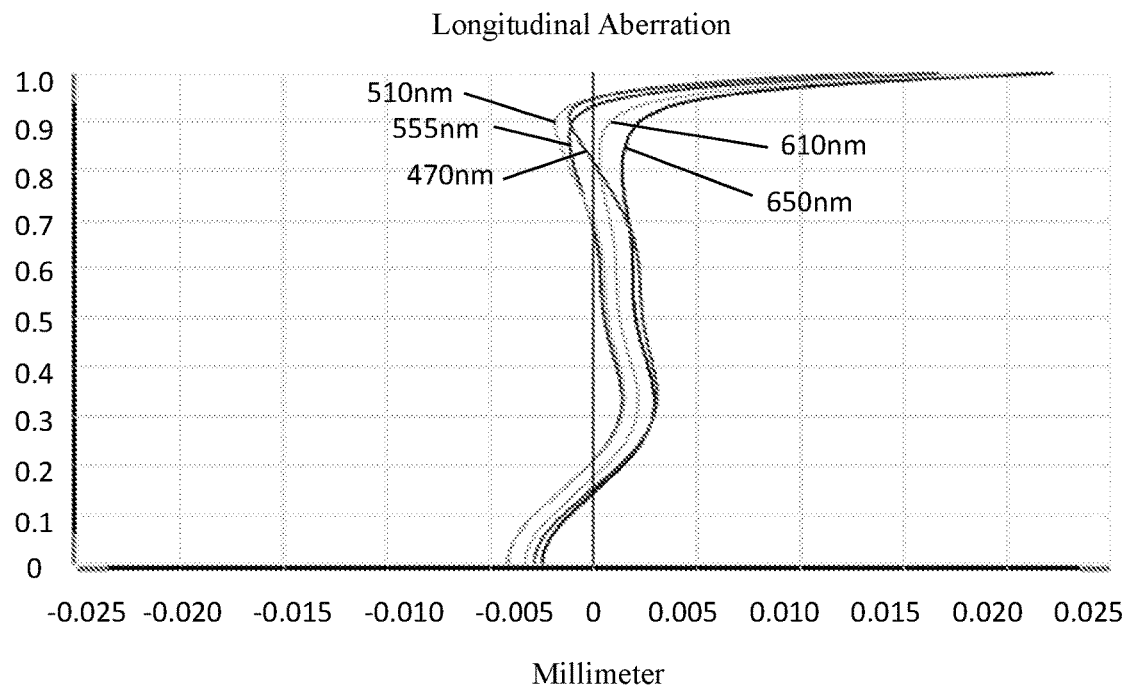
FIG. 10 is a schematic diagram of a longitudinal aberration of the camera optical lens shown in FIG. 9.
Figure 11:
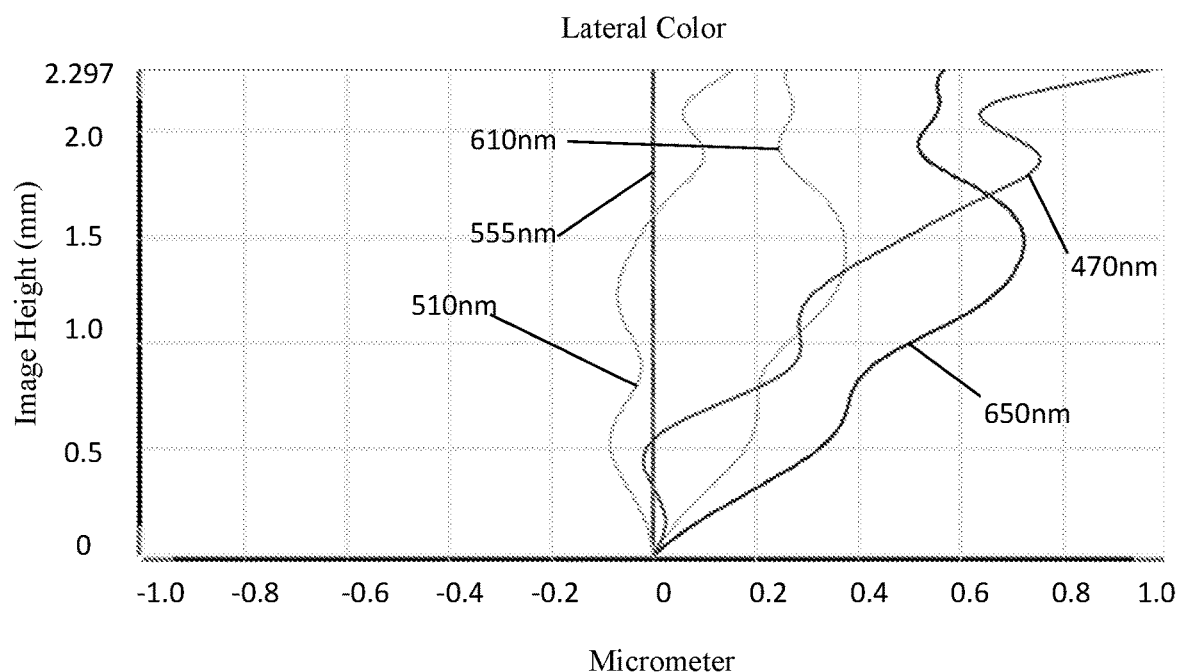
FIG. 11 is a schematic diagram of a lateral color of the camera optical lens shown in FIG. 9.
Figure 12:
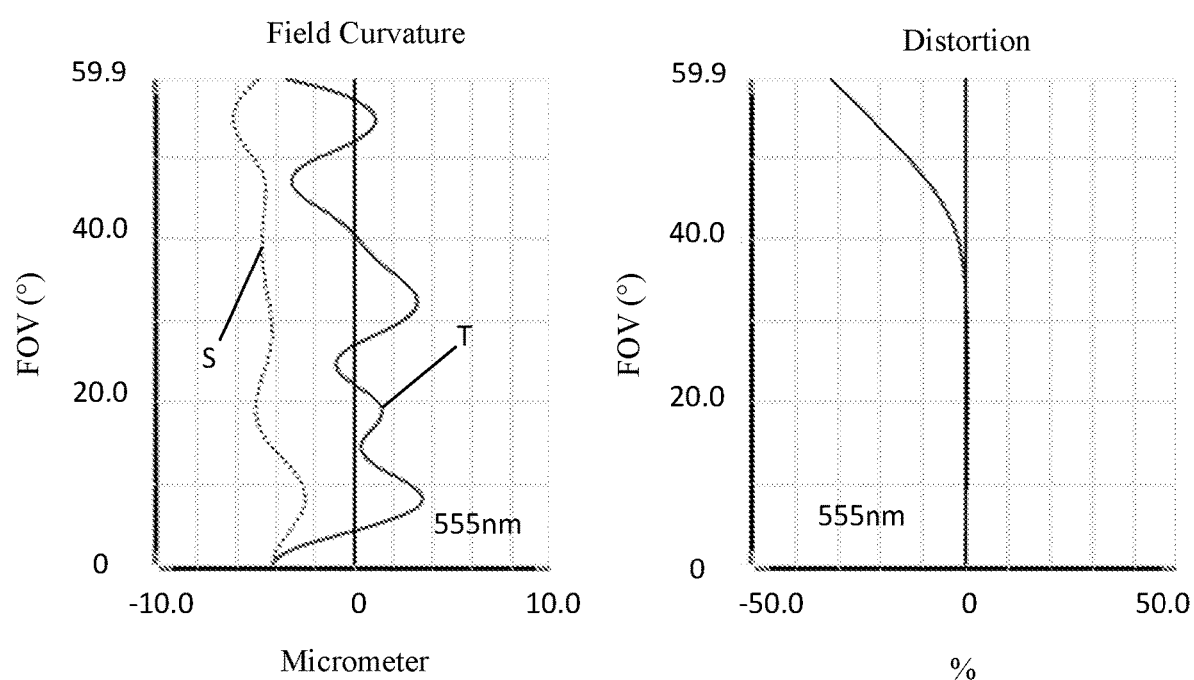
FIG. 12 is a schematic diagram of a field curvature and a distortion of the camera optical lens shown in FIG. 9.

FIG. 10 and FIG. 11 are schematic diagrams of a longitudinal aberration and a lateral color after light having a wavelength of 650 nm, 610 nm, 555 nm, 510 nm, and 470 nm passes through the camera optical lens 30 according to Embodiment 3. FIG. 12 is a schematic diagram of a field curvature and a distortion of the camera optical lens 30 after light having a wavelength of 555 nm passes through the camera optical lens 30 according to Embodiment 3.

Table 17 below shows numerical values corresponding to each condition in this embodiment according to the above conditions. It is appreciated that, the camera optical lens 30 in this embodiment satisfies the above conditions.

In this embodiment, an entrance pupil diameter ENPD of the camera optical lens 30 is 0.813 mm, a full-field image height IH is 2.297 mm, and a field of view FOV in a diagonal direction is 119.80°. The camera optical lens 30 satisfies design requirements for large aperture, wide angle and ultra-thinness. The on-axis and off-axis chromatic aberrations are fully corrected, thereby achieving excellent optical performances.

Embodiment 4

Figure 13:
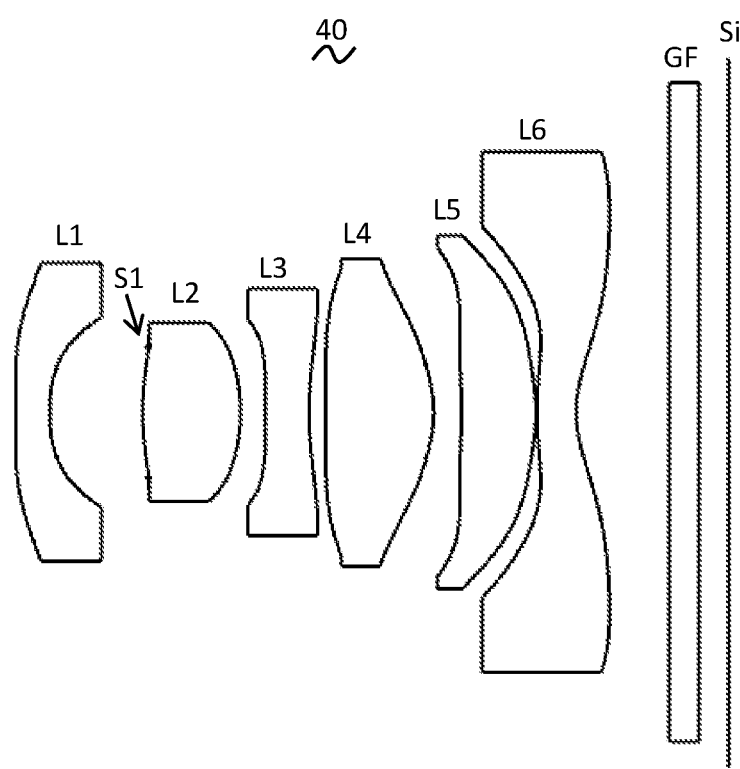
FIG. 13 is a structural schematic diagram of a camera optical lens according to Embodiment 4 of the present invention.

FIG. 13 shows a camera optical lens 40 according to Embodiment 4 of the present invention. Embodiment 4 is basically the same as Embodiment 1, and involves symbols having the same meanings as Embodiment 1, and only differences therebetween are listed below.

Design data of the camera optical lens 40 of Embodiment 4 of the present invention are shown in Tables 13 and 14.

TABLE 13

|  | R | d |  | nd |  | vd |
|---|---|---|---|---|---|---|
| S1 | ∞ | d0= | −0.934 |  |  |  |
| R1 | −6.344 | d1= | 0.238 | nd1 | 1.5444 | v1 | 55.82 |
| R2 | 1.239 | d2= | 0.658 |  |  |  |
| R3 | 2.025 | d3= | 0.690 | nd2 | 1.5444 | v2 | 55.82 |
| R4 | −1.259 | d4= | 0.176 |  |  |  |
| R5 | 45.714 | d5= | 0.308 | nd3 | 1.6400 | v3 | 23.54 |
| R6 | 2.383 | d6= | 0.120 |  |  |  |
| R7 | −8.567 | d7= | 0.761 | nd4 | 1.5444 | v4 | 55.82 |
| R8 | −0.814 | d8= | 0.198 |  |  |  |
| R9 | −2.043 | d9= | 0.522 | nd5 | 1.5444 | v5 | 55.82 |
| R10 | −1.224 | d10= | 0.010 |  |  |  |
| R11 | 2.766 | d11= | 0.275 | nd6 | 1.6400 | v6 | 23.54 |
| R12 | 0.790 | d12= | 0.656 |  |  |  |
| R13 | ∞ | d13= | 0.210 | ndg | 1.5168 | vg | 64.17 |
| R14 | ∞ | d14= | 0.214 |  |  |  |

Table 14 shows aspherical surface data of each lens in the camera optical lens 40 of Embodiment 4 of the present invention.

TABLE 14

|  | Conic coefficient | Aspherical surface coefficient | | | | |
|---|---|---|---|---|---|---|
|  | k | A4 | A6 | A8 | A10 | A12 |
| R1 | 3.4621E+01 | 9.8954E−01 | −2.4179E+00 | 4.8598E+00 | −6.8541E+00 | 6.1940E+00 |
| R2 | 1.6590E+00 | 1.1727E+00 | 4.0216E−01 | −2.3181E+01 | 1.4889E+02 | −4.5912E+02 |
| R3 | −7.0445E+00 | 2.6850E−02 | 8.8749E−01 | −1.9748E+01 | 1.7221E+02 | −9.4308E+02 |
| R4 | −1.3258E+01 | −1.0856E+00 | 1.7529E+00 | −3.6025E+00 | −3.1203E+00 | 2.6892E+01 |
| R5 | 2.0000E+02 | −6.0059E−01 | −7.1319E−01 | 2.3476E+00 | −6.4619E+00 | 6.3434E+00 |
| R6 | −1.9871E+01 | 1.4654E−01 | −1.9300E+00 | 7.4112E+00 | −1.5992E+01 | 1.9912E+01 |
| R7 | 1.9547E+01 | 5.6129E−01 | −2.1336E+00 | 6.4720E+00 | −1.1444E+01 | 1.1625E+01 |
| R8 | −4.8097E+00 | 2.9533E−01 | −1.6758E+00 | 3.5831E+00 | −4.7969E+00 | 4.4581E+00 |
| R9 | −4.0956E+01 | 1.0029E+00 | −3.2567E+00 | 5.9154E+00 | −7.3568E+00 | 5.8776E+00 |
| R10 | −9.6573E−01 | 1.2649E+00 | −4.2018E+00 | 7.4194E+00 | −8.1444E+00 | 5.5197E+00 |
| R11 | −2.0337E+00 | 3.3337E−02 | −2.4109E+00 | 4.9966E+00 | −5.0882E+00 | 2.9152E+00 |
| R12 | −1.4224E+00 | −7.9608E−01 | 8.1215E−01 | −5.1489E−01 | 2.1033E−01 | −5.3805E−02 |

TABLE 14-continued

| | Conic coefficient | Aspherical surface coefficient | | | |
|---|---|---|---|---|---|
| | k | A14 | A16 | A18 | A20 |
| R1 | 3.4621E+01 | −3.2248E+00 | 7.4025E−01 | 0.0000E+00 | 0.0000E+00 |
| R2 | 1.6590E+00 | 7.2543E+02 | −4.8832E+02 | 0.0000E+00 | 0.0000E+00 |
| R3 | −7.0445E+00 | 2.7578E+03 | −3.4886E+03 | 0.0000E+00 | 0.0000E+00 |
| R4 | −1.3258E+01 | −5.1713E+01 | 2.5116E+01 | 0.0000E+00 | 0.0000E+00 |
| R5 | 2.0000E+02 | −7.7516E+00 | 1.0698E+01 | 0.0000E+00 | 0.0000E+00 |
| R6 | −1.9871E+01 | −1.3497E+01 | 3.8959E+00 | 0.0000E+00 | 0.0000E+00 |
| R7 | 1.9547E+01 | −6.3460E+00 | 1.4419E+00 | 0.0000E+00 | 0.0000E+00 |
| R8 | −4.8097E+00 | −2.4292E+00 | 5.4897E−01 | 0.0000E+00 | 0.0000E+00 |
| R9 | −4.0956E+01 | −2.6868E+00 | 5.3028E−01 | 0.0000E+00 | 0.0000E+00 |
| R10 | −9.6573E−01 | −2.1252E+00 | 3.5724E−01 | 0.0000E+00 | 0.0000E+00 |
| R11 | −2.0337E+00 | −9.0534E−01 | 1.1950E−01 | 0.0000E+00 | 0.0000E+00 |
| R12 | −1.4224E+00 | 7.8155E−03 | −4.9220E−04 | 0.0000E+00 | 0.0000E+00 |

Design data of the inflection point and the arrest point of each lens in the camera optical lens 40 according to Embodiment 4 of the present invention are shown in Tables 15 and 16.

TABLE 15

| | Number of inflexion points | Inflexion point position 1 | Inflexion point position 2 | Inflexion point position 3 |
|---|---|---|---|---|
| P1R1 | 2 | 0.125 | 0.915 | / |
| P1R2 | 1 | 0.635 | / | / |
| P2R1 | 1 | 0.385 | / | / |
| P2R2 | 0 | / | / | / |
| P3R1 | 1 | 0.055 | / | / |
| P3R2 | 1 | 0.415 | / | / |
| P4R1 | 1 | 0.155 | / | / |
| P4R2 | 2 | 0.765 | 1.015 | / |
| P5R1 | 3 | 0.195 | 0.525 | 1.105 |
| P5R2 | 1 | 1.125 | / | / |
| P6R1 | 2 | 0.305 | 1.245 | / |
| P6R2 | 1 | 0.425 | / | / |

TABLE 16

| | Number of arrest points | Arrest point position 1 | Arrest point position 2 |
|---|---|---|---|
| P1R1 | 1 | 0.215 | / |
| P1R2 | 0 | / | / |
| P2R1 | 0 | / | / |
| P2R2 | 0 | / | / |
| P3R1 | 1 | 0.095 | / |
| P3R2 | 1 | 0.795 | / |
| P4R1 | 1 | 0.275 | / |
| P4R2 | 0 | / | / |
| P5R1 | 2 | 0.415 | 0.605 |
| P5R2 | 0 | / | / |
| P6R1 | 1 | 0.475 | / |
| P6R2 | 1 | 1.355 | / |

Figure 14:
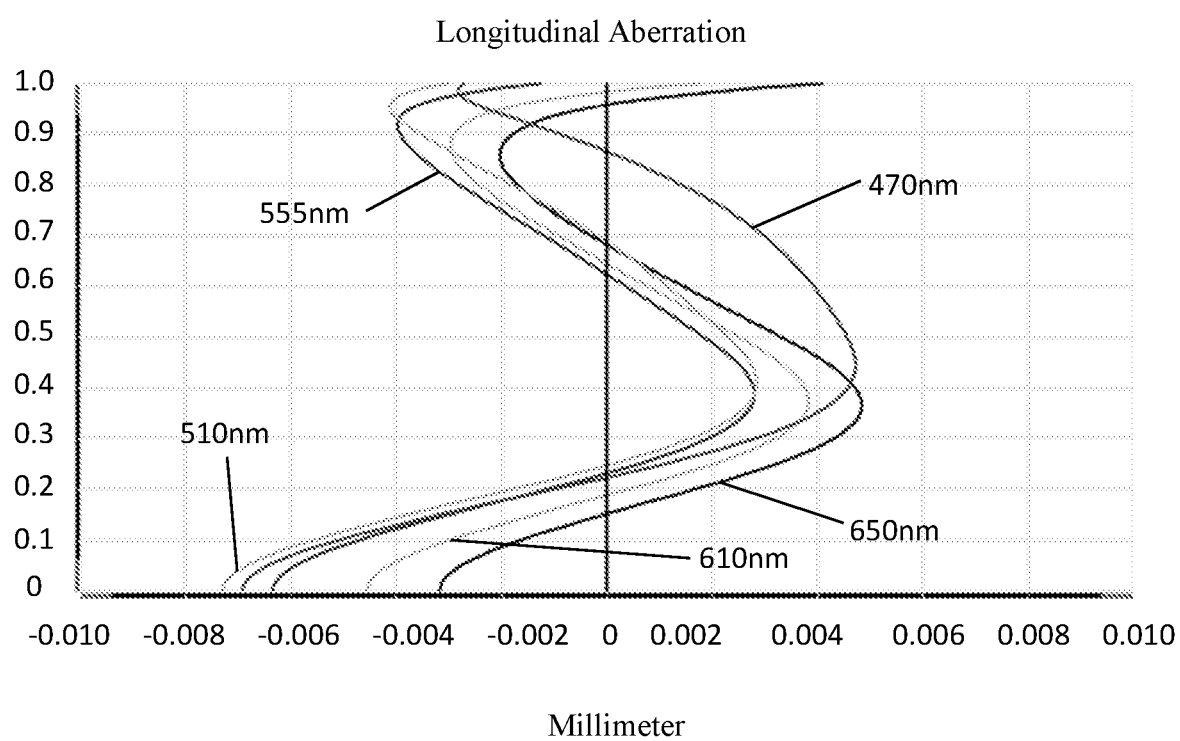
FIG. 14 is a schematic diagram of a longitudinal aberration of the camera optical lens shown in FIG. 13.
Figure 15:
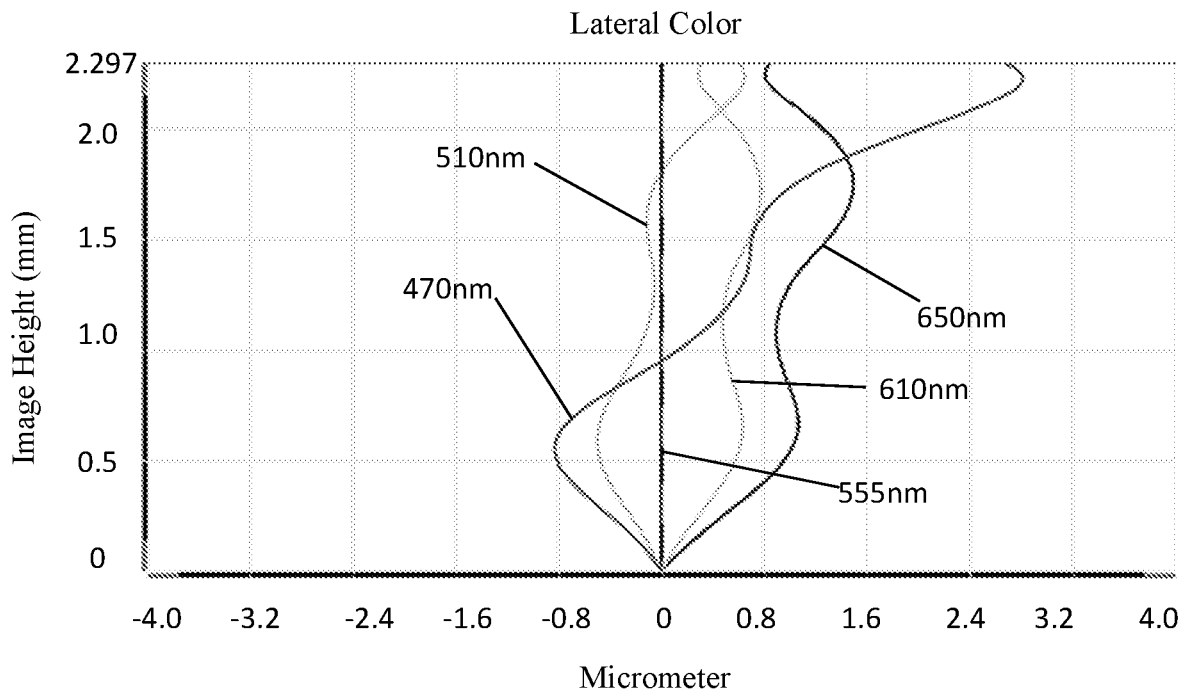
FIG. 15 is a schematic diagram of a lateral color of the camera optical lens shown in FIG. 13.
Figure 16:
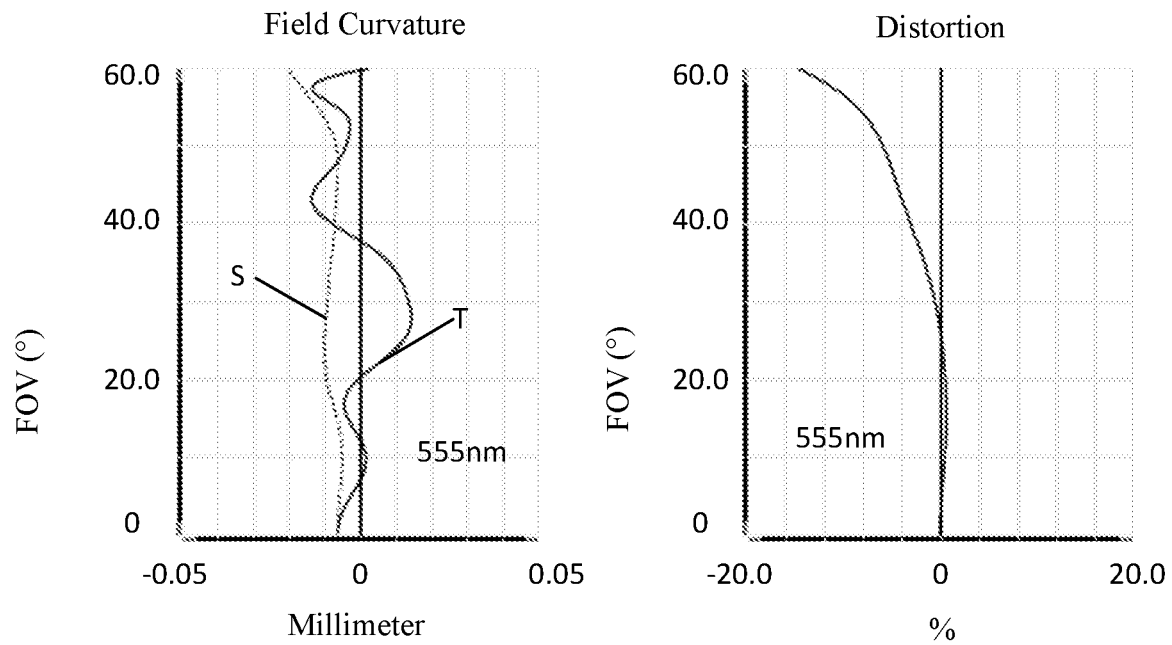
FIG. 16 is a schematic diagram of a field curvature and a distortion of the camera optical lens shown in FIG. 13.

FIG. 14 and FIG. 15 are schematic diagrams of a longitudinal aberration and a lateral color after light having a wavelength of 650 nm, 610 nm, 555 nm, 510 nm, and 470 nm passes through the camera optical lens 40 according to Embodiment 4. FIG. 12 is a schematic diagram of a field curvature and a distortion of the camera optical lens 30 after light having a wavelength of 555 nm passes through the camera optical lens 30 according to Embodiment 4.

Table 17 below shows numerical values corresponding to each condition in this embodiment according to the above conditions. It is appreciated that, the camera optical lens 40 in this embodiment satisfies the above conditions.

In this embodiment, an entrance pupil diameter ENPD of the camera optical lens 40 is 0.646 mm, a full-field image height IH is 2.297 mm, and a field of view FOV in a diagonal direction is 120.00°. The camera optical lens 40 satisfies design requirements for large aperture, wide angle and ultra-thinness. The on-axis and off-axis chromatic aberrations are fully corrected, thereby achieving excellent optical performances.

TABLE 17

| Parameters and conditions | Embodiment 1 | Embodiment 2 | Embodiment 3 | Embodiment 4 |
|---|---|---|---|---|
| f1/f | −1.78 | −2.78 | −2.00 | −1.21 |
| d9/d11 | 1.55 | 1.24 | 1.54 | 1.90 |
| f2/f | 0.80 | 0.87 | 0.71 | 0.99 |
| (R7 + R8)/(R7 − R8) | 2.14 | 4.98 | 3.10 | 1.21 |
| f | 1.782 | 1.722 | 1.950 | 1.551 |
| f1 | −3.166 | −4.794 | −3.907 | −1.877 |
| f2 | 1.432 | 1.494 | 1.393 | 1.535 |
| f3 | −3.667 | −5.494 | −3.806 | −3.909 |
| f4 | 3.404 | 8.453 | 5.070 | 1.592 |
| f5 | 2.553 | 1.995 | 2.927 | 4.560 |
| f6 | −1.745 | −1.423 | −1.581 | −1.814 |
| f12 | 1.748 | 1.672 | 1.570 | 2.181 |
| FNO | 2.40 | 2.40 | 2.40 | 2.40 |
| TTL | 4.396 | 4.166 | 4.518 | 5.036 |
| IH | 2.297 | 2.297 | 2.297 | 2.297 |
| FOV | 120.00° | 120.00° | 119.80° | 120.00° |

The above are only preferred embodiments of the present disclosure. Here, it should be noted that those skilled in the art may make modifications without departing from the inventive concept of the present disclosure, but these shall fall into the protection scope of the present disclosure

What is claimed is:

1. A camera optical lens, comprising from an object side to an image side:
    a first lens having negative refractive power;
    a second lens having positive refractive power;
    a third lens having negative refractive power;
    a fourth lens having positive refractive power;
    a fifth lens having positive refractive power; and
    a sixth lens having negative refractive power,
    wherein the camera optical lens has a total of six lenses, and further satisfies following conditions:

$$-2.80 \leq f1/f \leq -1.20;$$

$$1.20 \leq d9/d11 \leq 1.90;$$

$$0.09 \leq (R1+R2)/(R1-R2) \leq 1.01;$$

$$0.12 \leq (R3+R4)/(R3-R4) \leq 0.68;$$

$$1.20 \leq (R7+R8)/(R7-R8) \leq 5.00; \text{ and}$$

$$0.70 \leq f2/f \leq 1.00,$$

where f denotes a focal length of the camera optical lens;
f1 denotes a focal length of the first lens;
f2 denotes a focal length of the second lens;
R1 denotes a curvature radius of an object side surface of the first lens;
R2 denotes a curvature radius of an image side surface of the first lens;
R3 denotes a curvature radius of an object side surface of the second lens;
R4 denotes a curvature radius of an image side surface of the second lens;
R7 denotes a curvature radius of an object side surface of the fourth lens;
R8 denotes a curvature radius of an image side surface of the fourth lens;
d9 denotes an on-axis thickness of the fifth lens; and
d11 denotes an on-axis thickness of the sixth lens.

2. The camera optical lens as described in claim 1, wherein the camera optical lens satisfies a following condition:

$$1.10 \leq (R5+R6)/(R5-R6) \leq 3.00,$$

where

R5 denotes a curvature radius of an object side surface of the third lens; and
R6 denotes a curvature radius of an image side surface of the third lens.

3. The camera optical lens as described in claim 1, wherein the camera optical lens satisfies a following conditions:

$$0.02 \leq d1/TTL \leq 0.09,$$

where d1 denotes an on-axis thickness of the first lens; and
TTL denotes a total optical length from the object side surface of the first lens to an image plane of the camera optical lens along an optic axis.

4. The camera optical lens as described in claim 1, wherein the camera optical lens satisfies a following condition:

$$0.07 \leq d3/TTL \leq 0.24,$$

where d3 denotes an on-axis thickness of the second lens; and
TTL denotes a total optical length from an object side surface of the first lens to an image plane of the camera optical lens along an optic axis.

5. The camera optical lens as described in claim 1, wherein the camera optical lens satisfies following conditions:

$$-6.38 \leq f3/f \leq -1.30; \text{ and}$$

$$0.02 \leq d5/TTL \leq 0.09,$$

where f3 denotes a focal length of the third lens;
d5 denotes an on-axis thickness of the third lens; and
TTL denotes a total optical length from an object side surface of the first lens to an image plane of the camera optical lens along an optic axis.

6. The camera optical lens as described in claim 1, wherein the camera optical lens satisfies following conditions:

$$0.51 \leq f4/f \leq 7.36; \text{ and}$$

$$0.06 \leq d7/TTL \leq 0.23,$$

where f4 denotes a focal length of the fourth lens;
d7 denotes an on-axis thickness of the fourth lens; and
TTL denotes a total optical length from an object side surface of the first lens to an image plane of the camera optical lens along an optic axis.

7. The camera optical lens as described in claim 1, wherein the camera optical lens satisfies following conditions:

$$0.58 \leq f5/f \leq 4.41;$$

$$0.52 \leq (R9+R10)/(R9-R10) \leq 5.98; \text{ and}$$

$$0.05 \leq d9/TTL \leq 0.18,$$

where f5 denotes a focal length of the fifth lens;
R9 denotes a curvature radius of an object side surface of the fifth lens;
R10 denotes a curvature radius of an image side surface of the fifth lens;
d9 denotes an on-axis thickness of the fifth lens; and
TTL denotes a total optical length from an object side surface of the first lens to an image plane of the camera optical lens along an optic axis.

8. The camera optical lens as described in claim 1, wherein the camera optical lens satisfies following conditions:

$$-2.34 \leq f6/f \leq -0.54;$$

$$0.74 \leq (R11+R12)/(R11-R12) \leq 3.19; \text{ and}$$

$$0.03 \leq d11/TTL \leq 0.11,$$

where f6 denotes a focal length of the sixth lens;
R11 denotes a curvature radius of an object side surface of the sixth lens;
R12 denotes a curvature radius of an image side surface of the sixth lens;
d11 denotes an on-axis thickness of the sixth lens; and
TTL denotes a total optical length from an object side surface of the first lens to an image plane of the camera optical lens along an optic axis.

9. The camera optical lens as described in claim 1, wherein the camera optical lens satisfies a following condition:

$$TTL/IH \leq 2.20,$$

where

IH denotes an image height of the camera optical lens; and
TTL denotes a total optical length from an object side surface of the first lens to an image plane of the camera optical lens along an optic axis.

10. The camera optical lens as described in claim 1, wherein the camera optical lens further satisfies a following condition:

$$FOV \geq 119.80°,$$

where FOV denotes a field of view of the camera optical lens.

11. The camera optical lens as described in claim 1, wherein the camera optical lens further satisfies a following condition:

FNO≤2.41, where FNO denotes an F number of the camera optical lens.

12. The camera optical lens as described in claim 1, wherein the object side surface of the first lens is concave in a paraxial region, the object side surface of the fifth lens is concave in a paraxial region, and the object side surface of the sixth lens is convex in a paraxial region.

* * * * *